US008303812B2

(12) United States Patent
Chao

(10) Patent No.: US 8,303,812 B2
(45) Date of Patent: Nov. 6, 2012

(54) METHOD AND APPARATUS FOR SKIMMING FLOATED SLUDGE

(76) Inventor: Fang Chao, Middletown, NY (US)

(*) Notice: Subject to any disclaimer, the term of this patent is extended or adjusted under 35 U.S.C. 154(b) by 0 days.

(21) Appl. No.: 13/163,893

(22) Filed: Jun. 20, 2011

(65) Prior Publication Data
US 2011/0259803 A1 Oct. 27, 2011

Related U.S. Application Data

(63) Continuation-in-part of application No. 12/429,022, filed on Apr. 23, 2009, now Pat. No. 8,114,296.

(60) Provisional application No. 61/398,117, filed on Jun. 21, 2010.

(51) Int. Cl.
C02F 1/24 (2006.01)
E02B 15/04 (2006.01)

(52) U.S. Cl. .................. 210/221.2; 210/242.1
(58) Field of Classification Search ............... 210/221.2, 210/242.1
See application file for complete search history.

(56) References Cited

U.S. PATENT DOCUMENTS

| 1,366,767 | A | | 1/1921 | Callow |
| 3,556,301 | A | | 1/1971 | Smith |
| 3,565,254 | A | | 2/1971 | Latimer |
| 3,690,463 | A | | 9/1972 | O'Brien |
| 3,707,232 | A | | 12/1972 | Harrington |
| 3,760,944 | A | | 9/1973 | Bell |
| 3,831,756 | A | * | 8/1974 | Bhuta et al. .............. 210/109 |
| 3,966,614 | A | | 6/1976 | Ayers |
| 4,006,086 | A | | 2/1977 | Tsunoi |
| 4,049,554 | A | | 9/1977 | Ayers |
| 4,057,498 | A | | 11/1977 | Vidilles |
| 4,085,049 | A | | 4/1978 | Hartwick |
| 4,139,470 | A | | 2/1979 | Stagemeyer |
| 4,140,737 | A | | 2/1979 | Hauser |
| 4,157,952 | A | | 6/1979 | Krofta |
| 4,626,345 | A | | 12/1986 | Krofta |
| 5,015,393 | A | | 5/1991 | Russell |
| 5,047,156 | A | | 9/1991 | Sullivan |
| 5,108,591 | A | | 4/1992 | Hagan |
| 5,139,662 | A | | 8/1992 | Ozawa |
| 5,143,629 | A | | 9/1992 | Lint |
| 5,158,678 | A | | 10/1992 | Broussard |
| 5,382,358 | A | | 1/1995 | Yeh |
| 5,423,340 | A | | 6/1995 | Campbell |
| 5,713,697 | A | | 2/1998 | Steiner |
| 5,779,884 | A | | 7/1998 | Raymo |
| 5,863,441 | A | | 1/1999 | Krofta |

(Continued)

FOREIGN PATENT DOCUMENTS

EP 0065382 11/1982

Primary Examiner — Thomas M Lithgow
(74) Attorney, Agent, or Firm — Law Offices of Ira D. Blecker, P.C.

(57) ABSTRACT

A method and device for removing floated matter such as sludge located near the surface of a fluid body is contemplated that employs pneumatic force to remove the floated matter. The contemplated device employs pneumatic force for lifting and blowing the floated matter into an inlet channel. The device is configured to provide uniform airflow across the inlet channel. The inlet channel of the device may also include an adjustable section, or a fixed section and an airflow damper, which allows air flow along the channel to be controlled in a periodic fashion. There are also portable devices for removing such floated matter from the surface of a body of water.

14 Claims, 18 Drawing Sheets

U.S. PATENT DOCUMENTS

| | | |
|---|---|---|
| 5,888,406 A | 3/1999 | Hnatiuk |
| 6,159,361 A | 12/2000 | Lapointe |
| 6,287,460 B1 | 9/2001 | Van Schie |
| 6,709,587 B1 | 3/2004 | Guilmette |
| 6,790,370 B2 | 9/2004 | Terrien |
| 6,875,351 B2 | 4/2005 | Arnaud |
| 6,921,478 B2 | 7/2005 | Lambert |
| 6,960,294 B2 | 11/2005 | Arnaud |
| 7,014,779 B1 | 3/2006 | Kirchner |
| 7,384,548 B2 | 6/2008 | Terrien |
| 2003/0010685 A1 | 1/2003 | Michel |
| 2004/0168964 A1 | 9/2004 | Lambert et al. |
| 2005/0126996 A1 | 6/2005 | Herring, Sr. |
| 2007/0012605 A1 | 1/2007 | Chiang |
| 2008/0185351 A1 | 8/2008 | Hughes |
| 2008/0190834 A1 | 8/2008 | Urquhart et al. |

* cited by examiner

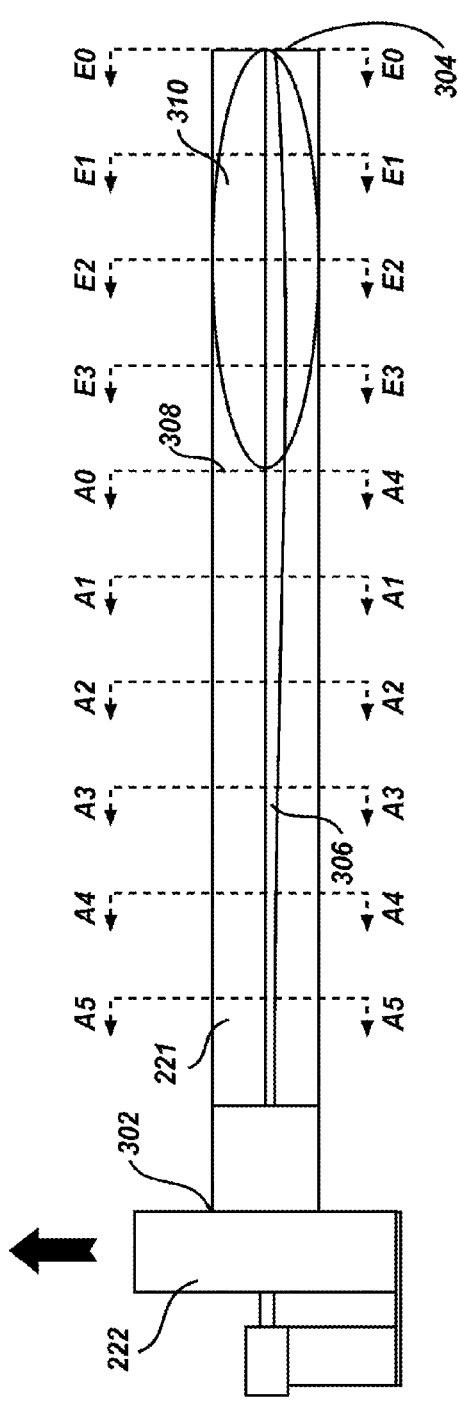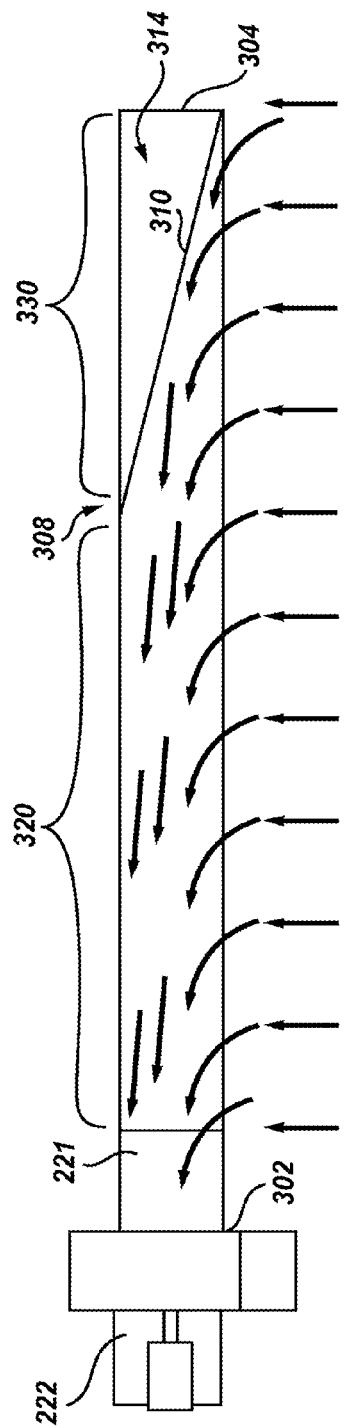
Fig. 3A
Fig. 3B

SECTION A0-A0

SECTION A1-A1

SECTION A2-A2

SECTION A3-A3

SECTION A4-A4

SECTION A5-A5

SECTION E4-E4   SECTION E3-E3   SECTION E2-E2

SECTION E2-E2   SECTION E0-E0

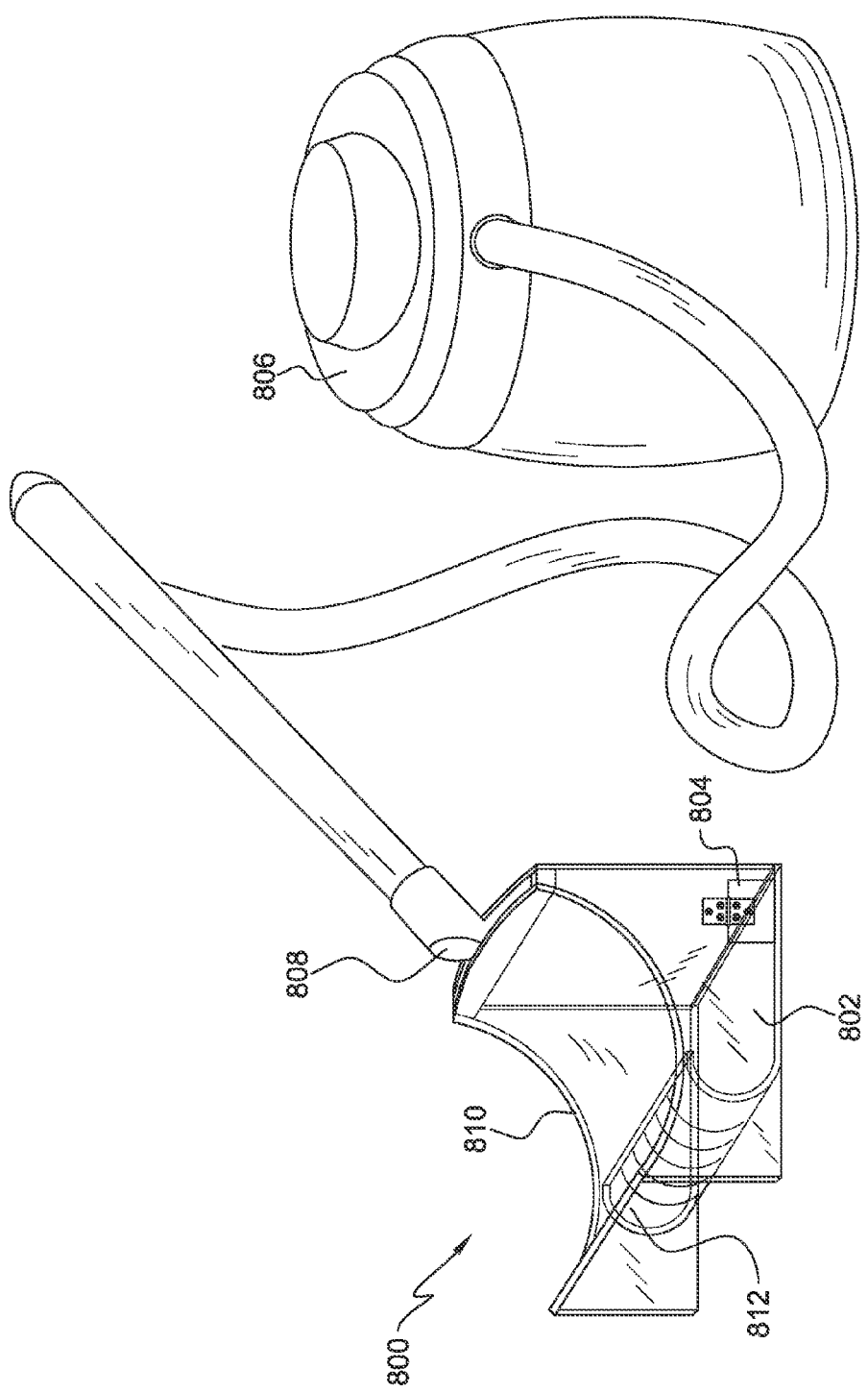

METHOD AND APPARATUS FOR SKIMMING FLOATED SLUDGE

RELATED APPLICATION DATA

The present application is a continuation in part application of U.S. patent application Ser. No. 12/429,022 entitled "Method and Apparatus for Skimming Floated Sludge" and filed Apr. 23, 2009, now U.S. Pat No. 8,114,296, and also claims priority from and Provisional U.S. Patent Application 61/398,117 entitled "Method and Apparatus for Skimming Floated Oil or Sludge" filed Jun. 21, 2010, the disclosures of each of which are incorporated by reference herein.

FIELD OF THE INVENTION

The present invention relates generally to the field of dissolved air flotation and particularly to a device for skimming floated sludge from the surface of a fluid body.

BACKGROUND

Several techniques, including a process known as dissolved air flotation (DAF), currently exist for removing suspended contaminants from a fluid body. The DAF process involves releasing dissolved air in a tank filled with the contaminated fluid. The released air forms microscopic bubbles which adhere to the suspended contaminants. The bubbles subsequently carry the suspended contaminants to the surface of the fluid body where they form a layer of floating sludge. Several devices are currently used for removing this sludge layer from the underlying fluid body. Existing devices, such as that described in U.S. Pat. No. 5,863,441, predominantly require the use of rakes, scrapers or mechanical scoops for separating the sludge layer. These systems are complex systems with numerous moving parts, making them susceptible to wear and mechanical failure. Furthermore, existing devices are costly and difficult to manufacture. Other prior art devices, such as those disclosed in U.S. Pat. Nos. 3,760,944 and 1,366,767 employ negative air pressure to suction oil, froth or foam from the surface of an underlying body. Such devices are not however feasible for removing floating sludge since floating sludge is at least partially submerged below the surface of the underlying body. Alternate systems for removing floating matter such as sludge from a fluid body are thus desired.

BRIEF SUMMARY

Methods and apparatus for removing floated matter such as sludge or oil located near the surface of a fluid body are contemplated. The contemplated embodiments comprise: a connection to an airflow power source (e.g. a blower or a vacuum or a fan) for generating negative pressure; an inlet channel with an upper plate positioned over an oil or floats surface and a lower plate that acts as a weir to prevent water or liquid falling into a separating chamber by gravity alone; a uniform airflow distribution (or collection) mechanism for providing uniform airflow along an inlet channel; and a separating chamber configured to cause air to travel up by the air power source and to cause oil (or floats) to fall down by gravity. In operation, sludge or oil may be removed by the contemplated devices through the following process: The air power source may be configured to cause the speed of the air under the upper plate of the inlet channel to increase. The velocity of the airflow generates negative pressure over the oil (or floats) surface. The negative pressure is increased until it is sufficiently strong to lift up the oil (or floats) over the lower plate of the inlet channel. The airflow then blows the lifted oil (or floats) into the separating chamber. After entering the separating chamber the air travels up to the air power source while the oil or floats with water or liquid falls down by gravity.

The contemplated sludge or oil removal devices requires few moving parts, requires less maintenance and can be manufactured at a lower cost relative to prior art sludge and oil removal devices. The contemplated sludge or oil removal devices employ pneumatic force for drawing sludge into an inlet channel. The devices are configured to provide uniform airflow across the inlet channel. The inlet channel may also include an adjustable section or a fixed section in combination with a damper which can be controlled to allow the pneumatic force to lift sludge from the surface of the underlying fluid body in a periodic fashion. The uniform airflow and periodic operation of the device allows sludge or oil of a high concentration (i.e. little fluid body dilution) to be collected.

BRIEF DESCRIPTION OF THE DRAWINGS

FIG. 3A is a diagram illustrating a front view of an air duct and air blower in accordance with the exemplary skimmer of FIG. 2.

FIG. 3B is a diagram illustrating a top view of the exemplary air duct and air blower of FIG. 3A.

FIG. 8A is a diagram illustrating a perspective view of a portable skimming device in accordance with another exemplary embodiment of the invention.

DETAILED DESCRIPTION

Reference will now be made in detail to the present exemplary embodiments of the invention, examples of which are illustrated in the accompanying drawings.

Applicant has recognized several deficiencies in existing skimmer devices. The present invention overcomes the limitations of prior art skimmer devices by providing a pneumatic skimmer device adapted to provide substantially uniform airflow across the length of an inlet channel. The inlet channel of the contemplated skimmer device may also include an adjustable section for providing precise control of the airflow velocity along the inlet channel. Control of the airflow velocity provides a mechanism for allowing floated sludge to be removed in a periodic manner (e.g. as the sludge builds up in front of the inlet channel). The uniformity and control of airflow through the inlet channel of the contemplated skimmer device allows sludge to be removed without significant dilution.

Figure 1A:
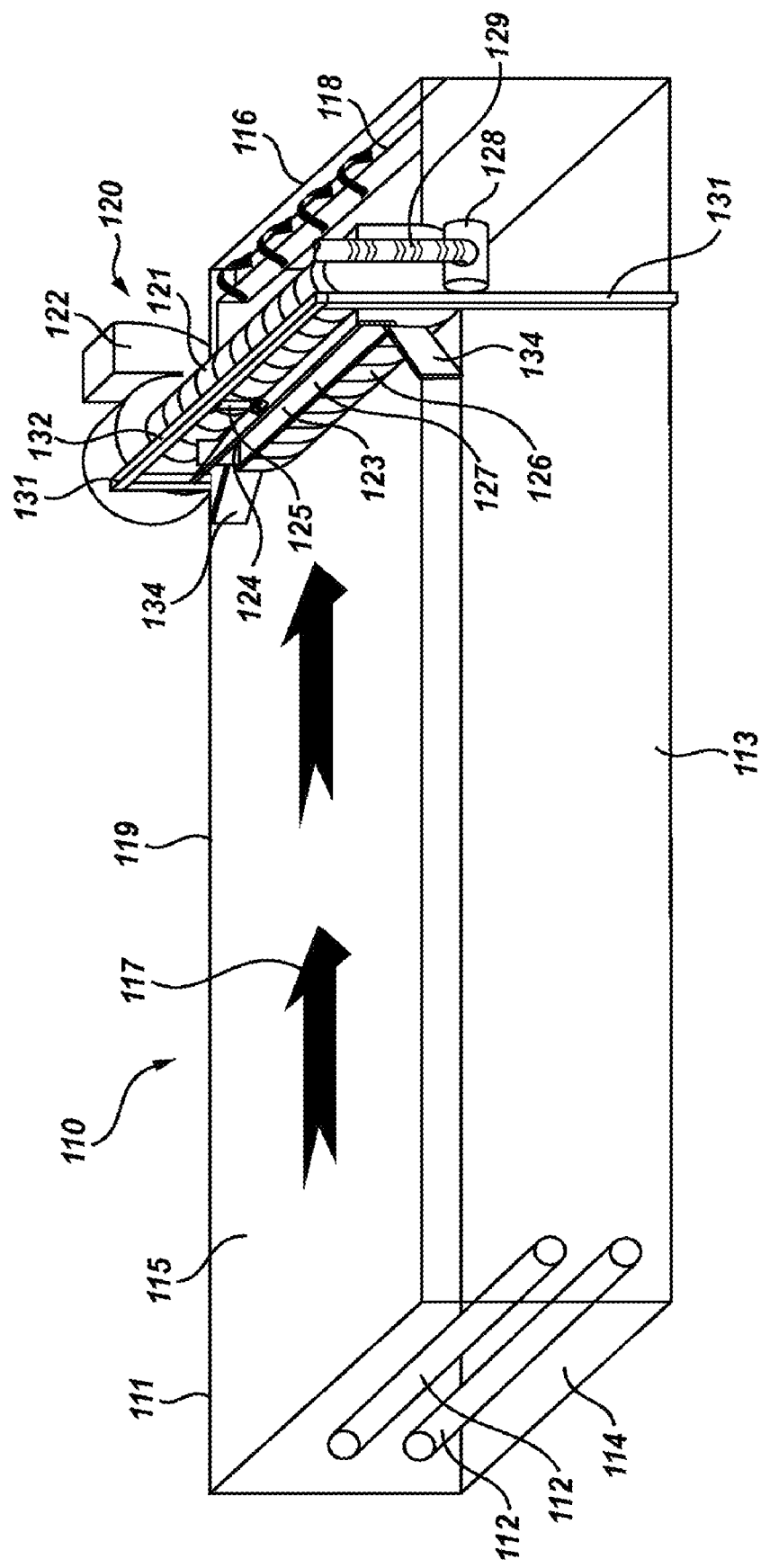
FIG. 1A is a diagram illustrating a perspective view of a DAF tank housing a sludge skimmer in accordance with an exemplary embodiment of the invention.

Referring to FIG. 1A, a diagram is shown illustrating a perspective view of a dissolved air flotation (DAF) tank 110 and a skimmer device 120 in accordance with an exemplary embodiment of the invention. As shown, the exemplary DAF tank 110 comprises a DAF tank housing 111 adapted to hold a fluid body 115 containing suspended matter that is desired to be removed from the fluid body 115. By way of example only, the DAF tank may be 20 feet (approximately 6.1 meters) long measured from a proximal end 114 to a distal end 116, 12 feet (approximately 3.7 meters) wide and 4 feet (approximately 1.2 meters) deep. The fluid body 115 may be waste water contaminated by suspended matter such as biological sludge, algae, fibers or other particulate contaminants introduced during various processes such those carried out at paper mills. One or more inlet pipes, labeled generally as 112, are disposed at the proximal end 114 of the DAF tank 110. The inlet pipes 112 are responsible for releasing microscopic air bubbles into the fluid body 115 contained in the DAF tank 110. These bubbles adhere to the suspended matter and carry the suspended matter to the surface of the fluid body 115 thereby forming a sludge layer near the surface of the fluid body 115. The skimmer device 120 is housed toward a distal end 116 of the DAF tank 110 and is responsible for removing the sludge layer from the surface of the underlying fluid body 115. The skimmer device 120 may be mounted to sidewalls 113 and 119 of the DAF tank 110 by way of one or more height adjustable bolts (not shown) or similar mounting mechanisms. The skimmer device 120 comprises a substantially cylindrical air duct 121. At a first end, the air duct 121 is connected to an air blower 122 which generates negative pressure to draw airflow through the air duct 121. By way of example only, the air blower 122 may be a NYB Blower (series 20 with 194 DH, 1980CFM, 2" SP, 1.1 BHP). The skimmer device 120 further comprises a separation chamber 126 for collecting sludge. The separation chamber 126 is connected at one end to a pump 128 for discharging sludge from the separation chamber 126. By way of example only, the pump 128 may be an air-powered diaphragm pump, such as that carried by McMaster-Carr (Part Number: 9948K11). The pump 128 is also connected to an outlet pipe 129 through which the pump discharges the sludge to an external sludge tank (not shown). The separation chamber 126 is longitudinally connected to a lower inlet plate 127. When the skimmer device 120 is mounted within the DAF tank 110 the top surface of the lower inlet plate 127 may be oriented substantially parallel to the surface of the fluid body 115. The top surface of the lower inlet plate 127 is also configured to be positioned a sufficient distance above the surface of the fluid body 115 to prevent gravity from alone causing the fluid to flow over the lower inlet plate 127. In a preferred embodiment, the lower inlet plate 127 may be positioned to be ⅛ of an inch (approximately 0.32 centimeters) above than the surface of the fluid body, however it is noted that the lower inlet plate 127 may be approximately coplanar with the surface of the fluid body 115 or may be positioned more than ⅛ of an inch above the surface of the fluid body 115. A distal portion of the lower inlet plate 127 is positioned below the air duct 121, forming an inlet channel 123 through which sludge is lifted and blown from the surface of the fluid body 115 in to the skimmer device 120. The minimum distance (labeled as D1 in FIG. 1D) between the lower inlet plate 127 and the air duct 121 determines the maximum air flow velocity through the inlet channel 123. By way of example only, this distance may be approximately 0.5 inches (approximately 1.27 centimeters). The section of the air duct 121 associated with this minimum distance D1 may be considered an upper section of the inlet channel 123, while the lower inlet plate 127 may be considered a lower section of the inlet channel 123. As shown, the proximal end of the lower inlet plate 127 protrudes beyond the upper section of the inlet channel 123. The air duct 121 is also connected to the separation chamber 126 and is adapted to uniformly distribute airflow longitudinally along the length of the inlet channel 123. The skimmer device 120 also comprises an upper inlet plate 124 configured with the skimmer device 220 to extend the inlet channel 123. By way of example only, the upper inlet plate 124 may be pivotally attached to the air duct 121 by way of hinges or similar attachment mechanisms. The skimmer device 120 may have two or more modes of operation. In each mode the upper inlet plate 124 may have a specific orientation relative to the skimmer device 120. By way of example only, the desired modes of operation may include a skimming mode and an idling mode. When the skimmer device 120 is operated in the skimming mode the upper inlet plate 124 is rotated toward the surface of the fluid body 115, thereby narrowing the extended section of the inlet channel 123. When in the skimming mode, the proximal end of the upper inlet plate 124 protrudes past the proximal end of the lower inlet plate 127, thus being positioned directly over the surface of the fluid body 115. In this manner air flow is increased in the extended section of the inlet channel 123 (including the area below the proximal end of the upper inlet plate 124). The increase in airflow velocity generates negative pressure in the extended section of the inlet channel 123. The negative pressure lifts the sludge that has built up near the proximal end of the lower inlet plate 127 and blows the lifted sludge in to the separation chamber 126. When the skimmer device 120 is in an idling mode the upper inlet plate 124 is rotated away from the surface of the fluid body 115, thereby opening the extended section of the inlet channel 123 and decreasing air flow at the proximal end of the extended section of the inlet channel 123. The pivoting motion of the upper inlet plate 124 thus allows the extended portion of the inlet channel 123 to be opened or narrowed periodically, thereby allowing the airflow velocity and its negative pressure through the extended portion of inlet channel 123 to be controlled. The skimmer device 120 further comprises an actuator 125. By way of example only, the actuator 125 may be a linear actuator such as a pneumatic or hydraulic cylinder attached to an upper surface of the upper inlet plate 124. The actuator 125 may also be attached to a support structure which as shown in FIG. 1A may include a horizontal support member 132 and two vertical support members labeled generally as 131. The vertical support members 131 may be externally mounted to the side walls 113 and 119 of the DAF tank housing 111 respectively. The actuator 125 may be automatically controlled by an external control system (not shown). The actuator 125 is responsible for controlling the pivoting motion of the upper inlet plate 124. It is to be understood that any type of extension mechanism that allows the inlet channel 123 to be opened and narrowed may be contemplated without departing from the spirit scope of the invention. As indicated by the arrow labeled as 117, the fluid body 115 moves from the proximal end 114 of the of the DAF tank housing 111 to the distal end 116 of the of the DAF tank housing 111. The movement of the fluid body 115 in this manner thus causes the sludge layer to build up at the proximal edge of the lower inlet plate 127 of the skimmer device 120. The exemplary DAF tank 110 may also house one or more buffer plates 134 for channeling the sludge layer towards the inlet channel 123 of the exemplary skimmer device 120. As discussed, the pivoting motion of the upper inlet plate 124 allows periodic opening or narrowing of the inlet channel 123, thereby allowing airflow velocity through inlet channel 123 to be controlled. The actuator 125 may be configured to adjust the position of the upper inlet plate 124 in a periodic fashion based on the flow rate of the fluid body 115 or the duration of time required for a sufficient amount of sludge to build up at the lower inlet plate 127 of the skimmer device 120. The actuator 125 may alternately operate in combination with timers and sensors, such as photo sensors, adapted to sense the amount of sludge that has built up in front of the lower inlet plate 127. In this manner the sensors may provide information to an external control system (not shown) capable of automatically determining when to lower (skimming) or raise (idling) the upper inlet plate 124. The DAF tank 110 also includes a water weir 118 located at the distal end 116 of the DAF tank 110. The water weir 118 extends from a first sidewall 113 to a second sidewall 119 of the DAF tank housing 111 and is disposed within the DAF tank housing 111 of the DAF tank 110 at a height sufficient for collecting clean fluid that flows beyond the skimmer device 120. The cleaned fluid is then discharged to a clean fluid tank through a pipe line (not shown).

Figure 1B:
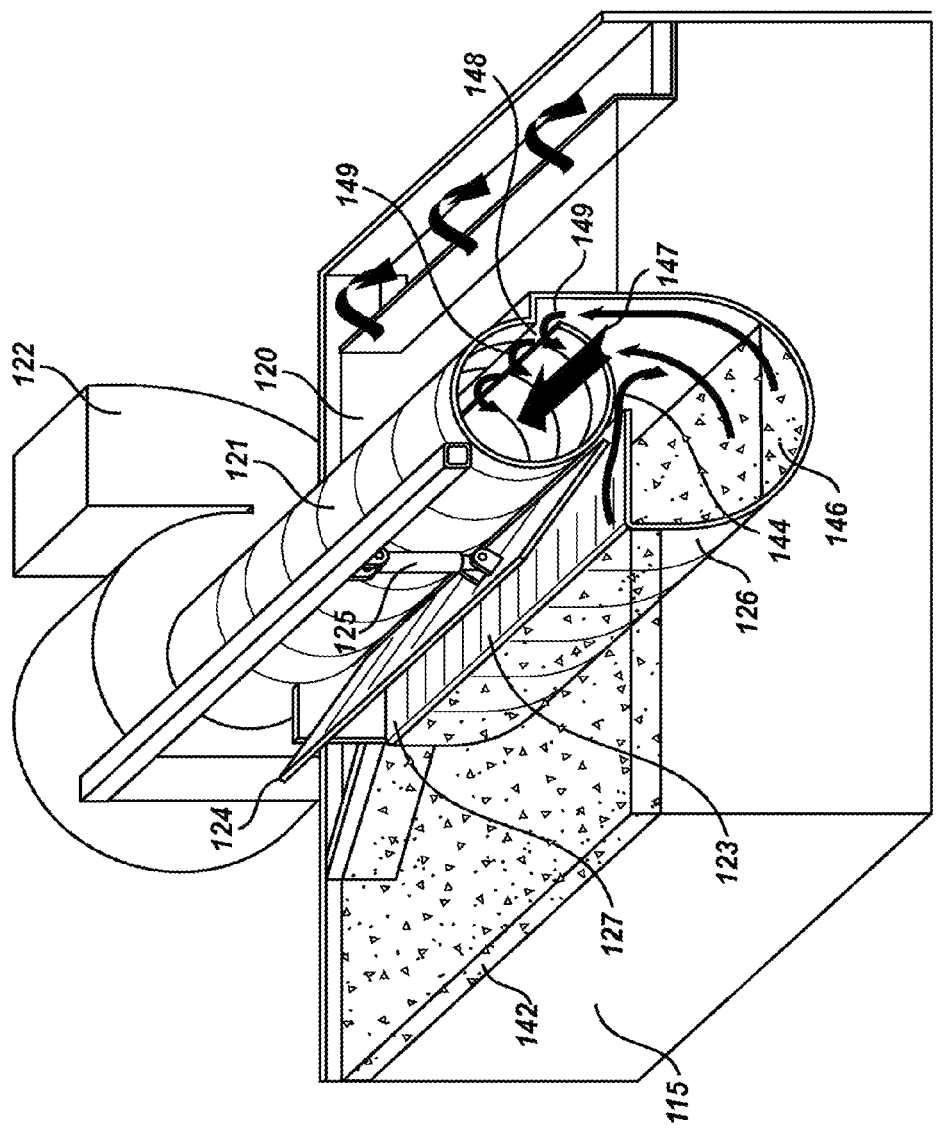
FIG. 1B is a diagram illustrating a perspective view of a section of the exemplary DAF tank and sludge skimmer of FIG. 1A.

Referring now to FIG. 1B a diagram is shown illustrating another perspective view of a section of the exemplary DAF tank and sludge skimmer of FIG. 1A. FIG. 1A illustrates the sludge layer 142 that floats near the surface of the fluid body 115. A portion of the sludge layer 142 located at the proximal end of the lower inlet plate 127 is lifted and blown across the lower inlet plate 127 and into the separation chamber 126 when sufficient negative air pressure exists above this portion of the sludge layer 142. The arrow labeled as 144 indicates the movement of this portion of the sludge layer 142 as it is drawn into the separation chamber 126. Sludge collects at the base of the separation chamber as indicated by element 146. Periodically, the pump 128 (shown in FIG. 1A) will extract the sludge 146 that accumulates in the separation chamber 126. Also shown in FIG. 1B is an arrow labeled as 147, indicating that the direction that air flows through the air duct 121 is generally towards the air blower 122. It is noted that the velocity of air through the air duct 121 decreases at points further away from the air blower 122. This is due to uniform airflow collection along the air duct 121 and airflow accumulation in the air duct 121 which has a substantially uniform diameter along its length. As shown, the air duct 121 also includes a cutout section 148 that allows air to be drawn into the air duct 121 from the separation chamber 126, as indicated by arrows labeled generally as 149, and ultimately from the inlet channel 123 of the skimmer device 120. The cutout section 148 may be shaped as a slot that is cut longitudinally along the length of the air duct 121 and increases in width at points further away from the air blower 122. The cutout section 148 may be shaped in this manner to compensate for the decrease in velocity of the airflow through the air duct 121 thereby providing uniform collection of airflow across the length of the inlet channel 123. It is to be understood that while in the exemplary embodiment the air collection is kept uniform by way of the cutout section 148 of changing width, other methods for compensating for the reduction in airflow velocity through the air duct 121 may be contemplated. Such methods may include modifying the shape of the air duct 121 to be conical, or by adding one or more additional air blowers to the opposite end of the air duct 121. These options are however less desirable than use of the cutout section 148 which is more cost effective.

Figure 1C:
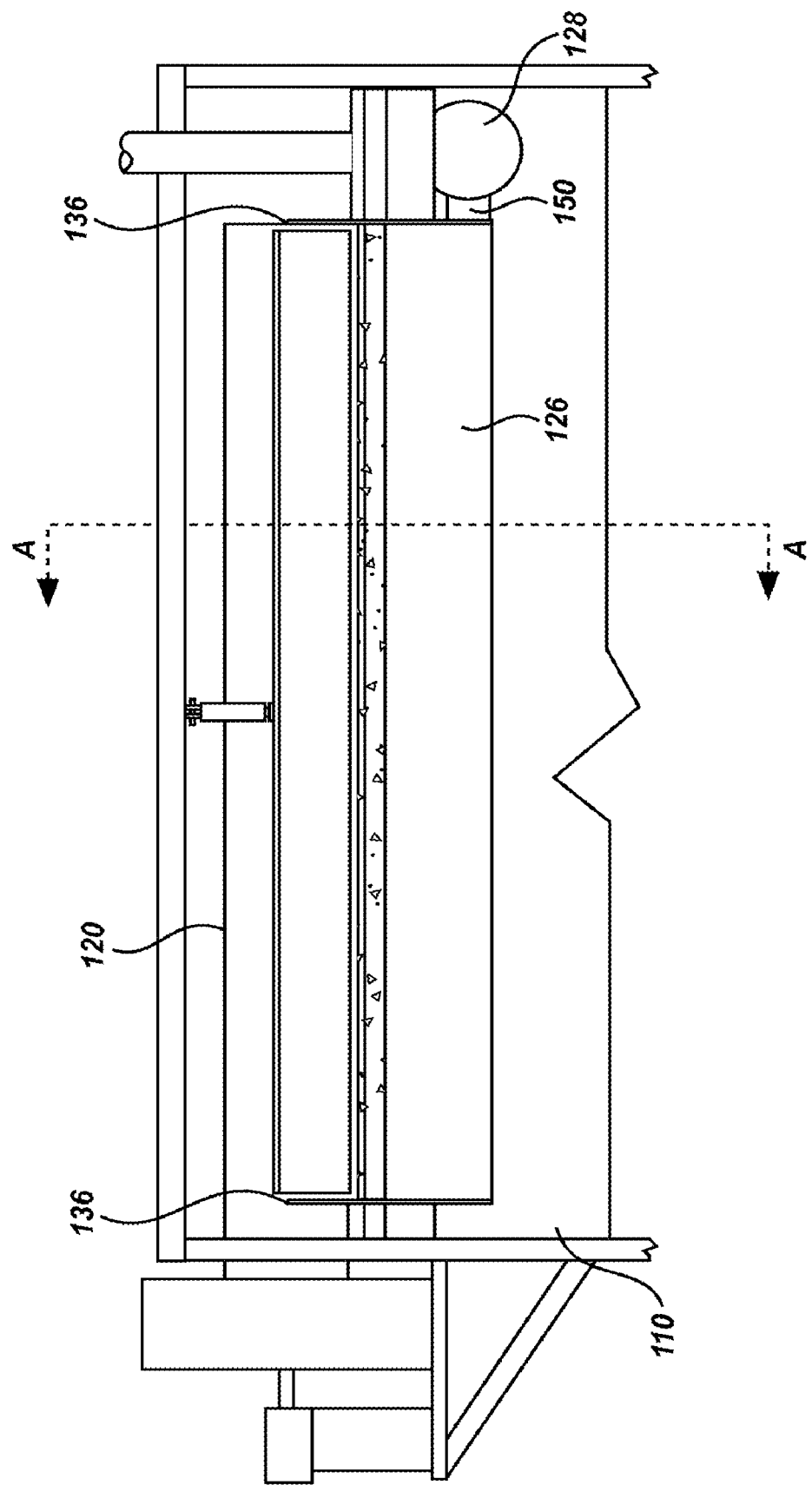
FIG. 1C is a diagram illustrating a front view of the exemplary DAF tank and sludge skimmer of FIG. 1A.

Referring now to FIG. 1C, a diagram is shown illustrating a front view of the exemplary DAF tank 110 and skimmer device 120 of FIG. 1A. As shown, the skimmer device 120 further comprises a connecting pipe 150 that attaches to a bottom of one of the capped sidewalls 136 of the separation chamber 126. The connecting pipe 150 connects the separation chamber 126 to the pump 128 providing a conduit to allow removal of sludge that collects in the separation chamber 126.

Figure 1D:
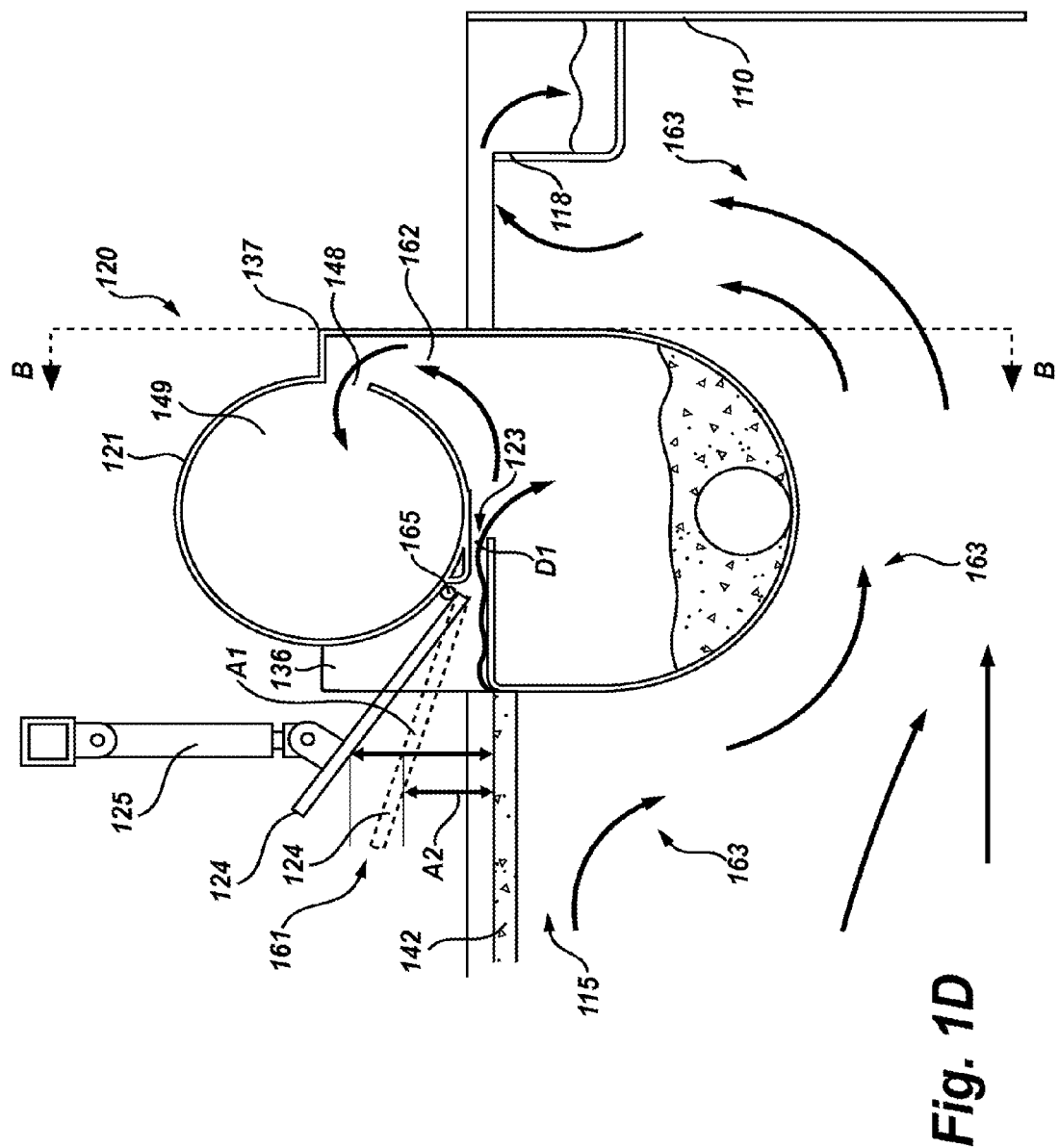
FIG. 1D is a diagram illustrating a section view of the exemplary DAF tank and sludge skimmer of FIG. 1A taken along line A-A, as indicated in FIG. 1C.
Figure 10:
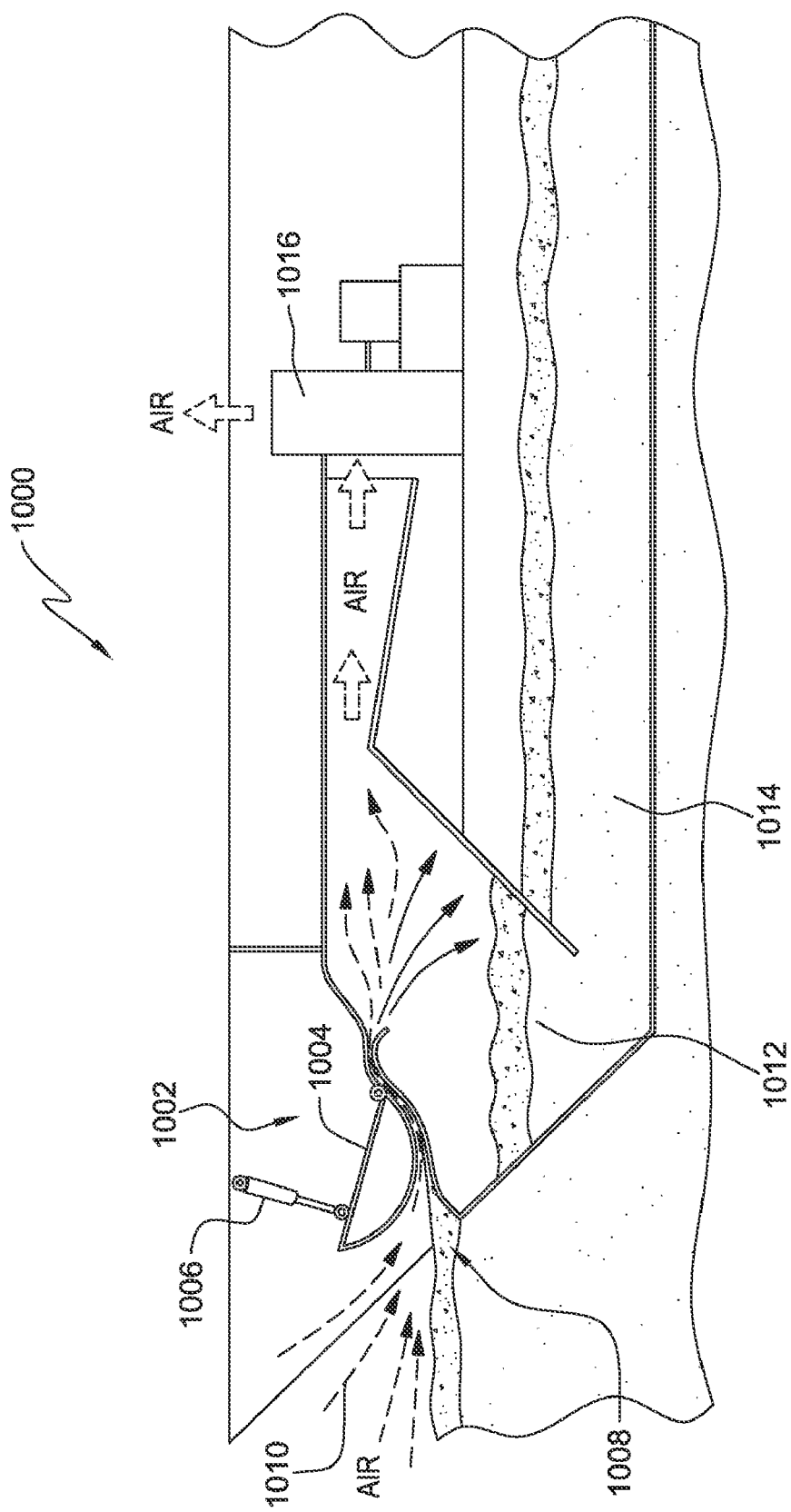
FIG. 10 is a diagram illustrating a side section view of a skimmer vessel in accordance with another exemplary embodiment of the invention.

Referring now to FIG. 1D, a diagram is shown illustrating a section view of the exemplary DAF tank 110 and skimmer device 120 of FIG. 1A taken along line A-A, as indicated in FIG. 1C. As shown, the cutout section 148 allows air to be drawn from the inlet channel 123 as indicated by arrow 161, through the separation chamber 126 as indicated by arrow 162 and into the air duct 121 as indicated by arrow 149. The contour of the cutout section 148 allows the airflow at the inlet channel 123 to be uniform along the longitudinal length of the inlet channel 123. Since the sludge layer 142 will tend to build up at the proximal edge of the lower inlet plate 127 in a uniform manner, it is beneficial to remove the sludge at a uniform rate along the longitudinal length of the inlet channel 123 so as to minimize the amount of the underlying fluid (such as water) that is drawn in with the sludge. Maintaining a high concentration of sludge is beneficial since it reduces the overall volume of removed matter and reduces the load on dewatering equipment that further separates the underlying fluid from the sludge. The ability of the exemplary skimmer device 120 to control airflow across the inlet channel 123 is thus a particular advantage of the invention. FIG. 10 also illustrates the flow of the underlying fluid in the DAF tank 110. As indicated by the arrows labeled generally as 163, the underlying fluid flows from the proximal end 114 of the DAF tank 110 toward the distal end 116 of the DAF tank 110, flowing under the skimmer device 120. As shown, the sludge layer 142 has been removed from fluid body 115 on the distal side of the skimmer device 120, allowing the underlying fluid to flow over the water weir 118 in a decontaminated state. The decontaminated fluid may then be discharged from the DAF tank 110 through another connecting pipe to a clean fluid tank (not shown). By way of example only, the separation chamber 126 and lower inlet plate 127 are formed from bent sheet metal, having a thickness of 1/16 of an inch (approximately 0.16 centimeters) and may be capped at each end by a sidewall labeled generally as 136. By way of example only, each sidewall may be a steel plate having a thickness of 1/2 inch (approximately 1.26 centimeters). The sidewalls 136 may be welded to the ends of the bent sheet metal used to form the separation chamber 126 and lower inlet plate 127. The separation chamber 126 and the lower inlet plate 127 may alternately be formed as separate components that are fixedly attached for example by welding the components together. The air duct 121 may also be formed from bent sheet metal having, for example, a thickness of 1/16 of an inch (approximately 0.16 centimeters) and may be attached to the separation chamber 126 along a seam labeled as 137. The air duct 121 may be removably attached to the separation chamber 126 by way of one or more bolts (not shown). Rubber seals (not shown) may be used to prevent air leakage from the air duct 121 when inserted into a top section of the separation chamber 126.

FIG. 1D also illustrates the hinge mechanism 165 that pivotally attaches the upper inlet plate 124 to the air duct 121. It is noted that a plurality of hinge mechanisms 165 may be employed. The hinge mechanism 165 allows the upper inlet plate 124 to pivotally rotate about a section of the air duct 121 to cause an opening or narrowing of the extended section of the inlet channel 123 (as discussed, the extended section of the inlet channel 123 includes the area below the upper inlet plate 124). In the exemplary embodiment the actuator 125 may be configured to rotate the upper inlet plate 124 between a first position in which the upper inlet plate 124 is considered to be in the idling position and a second position in which the upper inlet plate 124 is considered to be in the skimming position. The upper inlet plate 124 is shown with solid lines in the first or idling position at an angle labeled as A1 measured from the upper surface of the sludge layer. The upper inlet plate 124 is shown with dashed lines in the second or skimming position at an angle labeled as A2 measured from the upper surface of the sludge layer. The angle A1 associated with the idling position is chosen to be sufficiently large to prevent the sludge and underlying fluid from being lifted over the lower inlet plate 127, even while the air blower 122 is actively drawing in air. By way of example only, the angle A1 may be 60 degrees. The angle A2 associated with the second or skimming position is chosen to allow the airflow velocity at the proximal edge of the lower inlet plate 127 to be sufficiently large to lift the sludge over the lower inlet plate 127 and blow the sludge through the inlet channel 123 and into the separation chamber 126 while the air blower 122 is actively drawing in air. By way of example only, angle A2 may be 15 degrees. It is noted that the angle A2, will be dependent on a number of factors including the flow capacity of the air blower 122 and the depth of the sludge layer 142. However, since the angle A2 is not fixed, only a maximum flow capacity of the air blower 122 must be determined prior to installation of the skimmer device 120. The desired airflow velocity may be achieved by calibrating the angles A1 and A2 during or after installation of the skimmer device 120. The maximum flow capacity of the air blower 122 may be determined based on a maximum desired sludge layer depth, the known longitudinal length of the inlet channel 123 and the minimum distance, labeled as D1, between the distal end of the lower inlet plate 127 and the air duct 121. The maximum flow capacity of the air blower 122 may be determined by the following Equation (1):

$$Q = A \times V_{max} \qquad (1)$$

In the preceding Equation (1), Q represents the flow capacity of the blower; A represents the area of the inlet channel 123 which is determined by multiplying the length of the inlet channel 123 by the distance D1; $V_{max}$ represents the maximum desired airflow velocity at the narrowest section (having a distance D1) of the inlet channel 123. $V_{max}$ is determined by the Bernoulli Equation (2):

$$H = V_{max}^2 / (2 \ast g) \qquad (2)$$

In the preceding Equation (2), H represents the maximum lifting height of the sludge layer 142. $V_{max}$ represents the corresponding airflow velocity required for the height of lifting and g represents the acceleration of gravity. As discussed, since the angle A2 is not fixed, the angle A2 of upper inlet plate 124 may then be calibrated depending in part on the actual depth of the sludge layer 142. The actuator 125 controls the position of the upper inlet plate 124. In operation, the actuator 125 may be configured to operate in a periodic manner, raising and lowering the upper inlet plate 124 between the skimming and idling positions, based on the flow rate of the fluid body 115 or the duration of time required for a sufficient amount of sludge to build up at the proximal edge of the lower inlet plate 127 of the skimmer device 120. The periodicity may be calibrated during or after installation of the skimmer device 120 in a DAF tank.

Figure 1E:
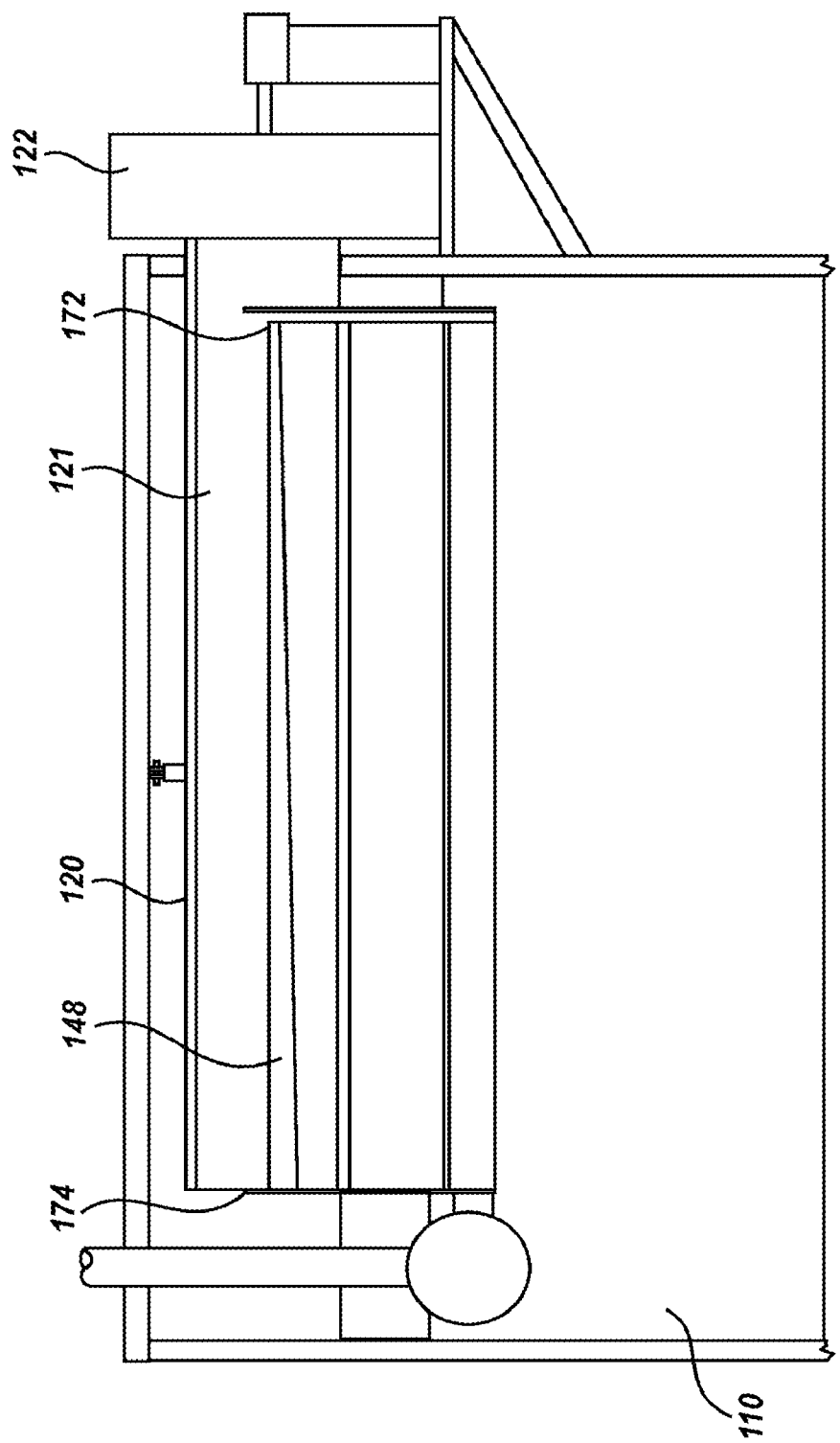
FIG. 1E is a diagram illustrating a section view of the DAF tank and sludge skimmer of FIG. 1A taken along line B-B, as indicated in FIG. 1D.

Referring now to FIG. 1E a diagram is shown illustrating a section view of the DAF tank 110 and skimmer device 120 of FIG. 1A taken along line B-B, as indicated in FIG. 1D. FIG. 1E illustrates the change in width of the cutout section 148 that is responsible for providing uniform airflow across the longitudinal length of the inlet channel 123 of the skimmer device 120. As shown, the slot-shaped cutout section 148 has a smaller width at a first end labeled as 172 (closer to the air blower 122) and increases in width towards a second end 174. By way of example only, the air duct 121 may be approximately 6 feet (approximately 1.8 meters) in length and 11 inches (approximately 0.28 meters) in diameter. The slot-shaped cutout section 148 may be may be approximately 0.8 inches (approximately 2 centimeters) in width at the first end 172 and increase to 5 inches (approximately 12.7 cm centimeters) in width at the second end 174.

The width of the slot-shaped cutout section 148, may be calculated at a given point by the following Equation (3):

$$W_I = R/V_I \qquad (3)$$

In the preceding Equation (3), $W_I$ represents the width of the slot at a distance I; R represents the rate of uniforth airflow collection in units of Cubic Feet per Minute (CFM)/(Foot) FT which is a constant along the air duct 121; $V_I$ represents the airflow velocity inside the air duct 121 at the distance L in units of Feet per Minute (FPM).

Figure 2:
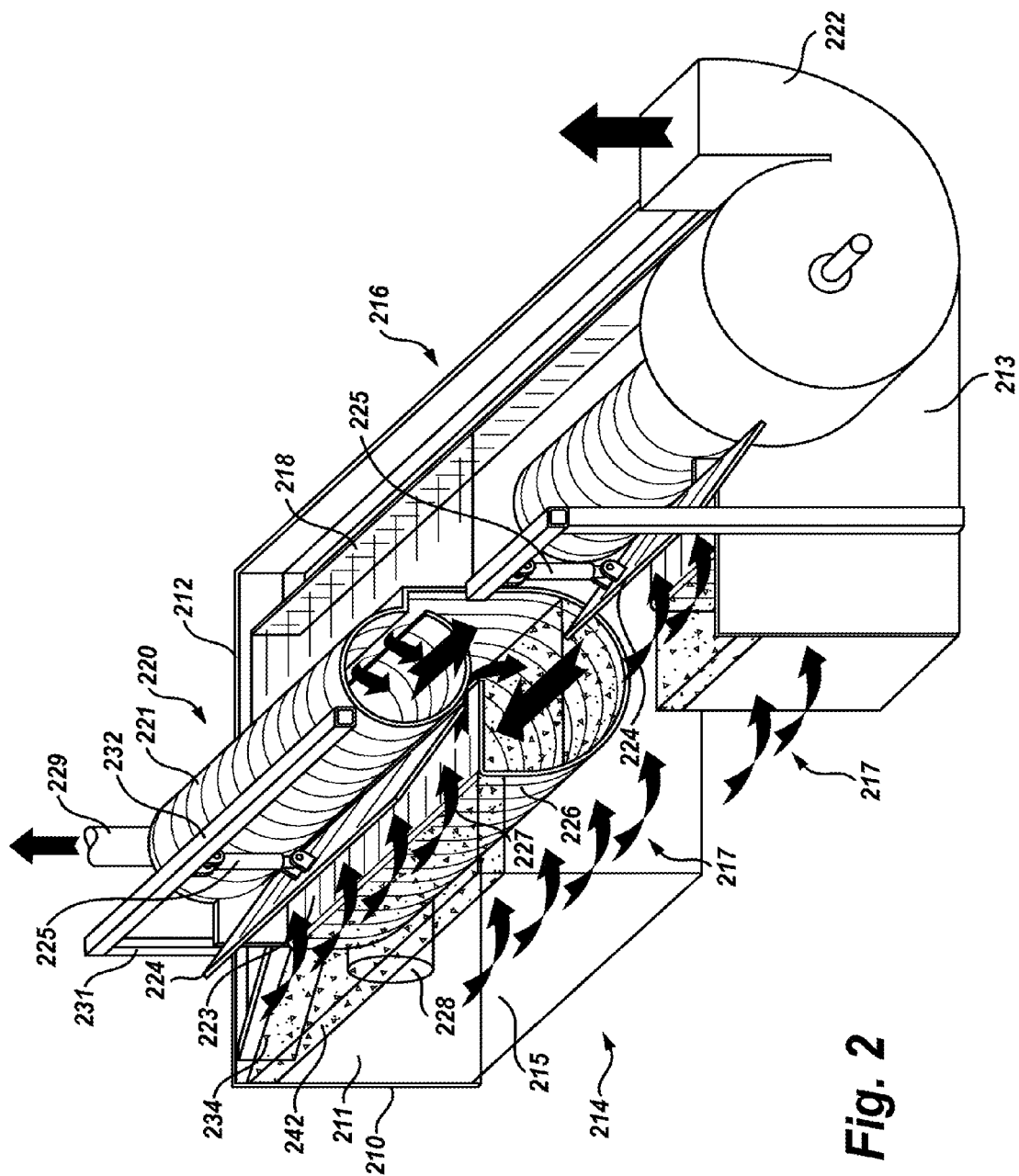
FIG. 2 is a diagram illustrating a perspective view of a DAF tank housing a sludge skimmer in accordance with another exemplary embodiment of the invention.

Referring now to FIG. 2, a diagram is shown illustrating a perspective view of a DAF tank 210 and skimmer device 220 in accordance with another exemplary embodiment of the invention. As shown, the exemplary DAF tank 210 comprises a DAF tank housing 211 adapted to hold a fluid body 215 containing suspended matter that is desired to be removed from the fluid body 215. The fluid body 215 may be waste water contaminated by suspended matter such as biological sludge, algae, fibers or other particulate contaminants introduced during various processes such those carried out at paper mills. One or more inlet pipes (not shown), are disposed at a proximal end 214 of the DAF tank 210. The inlet pipes are responsible for releasing microscopic air bubbles into the fluid body 215 contained in the DAF tank 210. These bubbles adhere to the suspended matter and carry the suspended matter to the surface of the fluid body 215 thereby forming a sludge layer 242 near the surface of the fluid body 215. The skimmer device 220 is housed toward a distal end 216 of the DAF tank 210 and is responsible for removing the sludge layer 242 from the surface of the underlying fluid body 215. The skimmer device 220 comprises a substantially cylindrical air duct 221 adapted to uniformly distribute airflow longitudinally along an inlet channel 223. The air duct 221 is connected to an air blower 222 at one end which generates negative pressure to draw airflow through the air duct 221. The skimmer device 220 further comprises a separation chamber 226 for collecting sludge. The separation chamber 226 is connected at one end to a pump 228. The pump 228 is also connected to an outlet pipe 229 through which the pump discharges the sludge to an external sludge tank (not shown). The separation chamber 226 is also longitudinally connected to a lower inlet plate 227. When the skimmer device 220 is mounted within the DAF tank 210, the top surface of the lower inlet plate 227 may be oriented substantially parallel to the surface of the fluid body 215. The top surface of the lower inlet plate 227 is also configured to be positioned a sufficient distance above the surface of the fluid body 115 to prevent gravity from alone causing the fluid to flow over the lower inlet plate 127. A distal portion of the lower inlet plate 227 is positioned below the air duct 221, forming the inlet channel 223 through which sludge is lifted and blown from the surface of the fluid body 215 in to the skimmer device 220. The minimum distance between the lower inlet plate 127 and the air duct 121 determines the maximum air flow velocity through the inlet channel 223. By way of example only, this distance may be approximately 0.5 inches (approximately 1.27 centimeters). The section of the air duct 221 associated with this minimum distance may be considered the upper section of the inlet channel 223, while the distal end of the lower inlet plate 227 may be considered the lower section of the inlet channel 223. As shown, the proximal end of the lower inlet plate 227 protrudes beyond the upper section of the inlet channel 223. The lower inlet plate 227 and separation chamber 226 may be formed as a single structure or as multiple components in a similar manner to that discussed with regard to the embodiment of FIG. 1A. The skimmer device 220 may also comprise a plurality of upper inlet plates, labeled generally as 224, configured with the skimmer device 220 to extend the inlet channel 223. By way of example only, the upper inlet plates 224 may be pivotally attached to the air duct 221 by way of hinges or similar attachment mechanisms. The skimmer device 220 may have two or more modes of operation. In each mode of operation the upper inlet plates 224 may each have a specific orientation relative to the skimmer device 220. By way of example only, the desired modes of operation may include a skimming mode and an idling mode. When the skimmer device 220 is operated in the skimming mode each of the upper inlet plates 224 is rotated toward the surface of the fluid body 115, thereby narrowing the extended section of the inlet channel 123. When operated in the skimming mode, the proximal end of each of the upper inlet plates 224 will protrude past the proximal end of the lower inlet plate 227, thus being positioned directly over the surface of the fluid body 115. In this manner the air flow is increased in the extended section of the inlet channel 223 (including the area below the proximal end of each of the upper inlet plates 224). The increase in airflow velocity generates negative pressure in the extended section of the inlet channel 223. The negative pressure lifts the sludge that has built up near the proximal end of the lower inlet plate 227 and blows the lifted sludge in to the separation chamber 226. When the skimmer device 220 is operated in the idling mode the upper inlet plates 224 are rotated away from the surface of the fluid body 215, thereby opening the extended section of the inlet channel 223 and decreasing air flow at the proximal end of the extended section of the inlet channel 223. While two upper inlet plates 224 are shown in FIG. 2, it is to be understood that any number of upper inlet plates 224 may be employed depending on application specific factors such as the length of the skimmer device 220 and desired flexibility of operation. The pivoting motion of the upper inlet plates 224 thus allows the extended portion of the inlet channel 223 to be opened or narrowed periodically, thereby allowing the airflow velocity and its negative pressure through the extended portion of inlet channel 223 to be controlled. Use of a plurality of upper inlet plates 224 provides greater operator control of the airflow across the longitudinal length of the inlet channel 223 of the skimmer device 220. The exemplary skimmer device 220 further comprises a plurality of actuators, labeled generally as 225. By way of example only, each actuator 225 may be a linear actuator such as a pneumatic or hydraulic cylinder attached to an upper surface of one of the upper inlet plates 224. While two actuators 225 are shown in the exemplary embodiment, it is to be understood that any number of actuators 225 may be employed depending in part on the number of upper inlet plates 224 used. Each actuator 225 may also be attached to a support structure which as shown in FIG. 2 may include a horizontal support member 232 and two vertical support members labeled generally as 231. The vertical support members 231 may be externally mounted to the side walls 212 and 213 of the DAF tank housing 211 respectively. The actuators 225 may be automatically controlled by an external control system (not shown). It is to be understood that any type of extension mechanism that allows the inlet channel 223 to be opened and narrowed may be contemplated without departing from the spirit and scope of the invention. As indicated by the arrows labeled generally as 217, the fluid body 215 moves from the proximal end 214 of the of the DAF tank housing 211 to a distal end 216 of the of the DAF tank housing 211. The movement of the fluid body 215 in this manner thus causes the sludge layer 242 to build up at proximal edge of the lower inlet plate 227. The exemplary DAF tank 210 may also house one or more buffer plates 234 for channeling said sludge layer 242 towards the inlet channel 223 of the exemplary skimmer device 220. The actuators 225 are responsible for controlling the pivoting motion of the upper inlet plates 224. The actuators 225 may be configured to operate in a periodic fashion based on the flow rate of the fluid body 215 or the duration of time required for sufficient sludge to build up at the lower inlet plate 227 of the skimmer device 220. The actuator 225 may alternately operate in combination with timers and sensors, such as photo sensors, adapted to sense the amount of sludge that has built up in front of the lower inlet plate 227. In this manner the sensors may provide information to an external control system (not shown) capable of automatically determining when to lower (skimming) or raise (idling) the upper inlet plate 124 The DAF tank 210 also includes a water weir 218 located at the distal end 216 of the DAF tank 210. The water weir 218 extends from a first sidewall 212 to a second sidewall 213 of the DAF tank housing 211 and is adapted to collect clean water that flows beyond the skimmer device 220.

Referring now to FIGS. 3A and 3B, diagrams are shown illustrating front and top views of the air duct 221 and air blower 222 of FIG. 2. The air duct 221 is connected to an air blower 222 at a first end 302 which generates airflow through the air duct 221. By way of example only the air blower 122 may be a NYB Blower (series 20 with 194 DH, 1980CFM, 2" SP, 1.1 BHP). As discussed, the air duct 221 is substantially cylindrical in shape. By way of example only, the air duct 221 may be approximately 10 feet (approximately 3 meters) in length and 11 inches (approximately 0.28 meters) in diameter and may be comprised of bent sheet metal having, for example, a thickness of approximately 1/16 inch. The air duct 221 also includes a slot-shaped cutout section 306 for uniformly distributing airflow along the length of the inlet channel 223. The cutout section 306 is cut substantially along the length of the air duct 221. In the exemplary embodiment, the cutout section 306 may increase in size along a first section 320 of the air duct 221, increasing in width from the first end 302 of the air duct 221 to an intermediate point 308 located approximately 6 feet (approximately 1.8 meters) from the first end 302. The cutout section 306 is shaped in this manner to achieve uniform airflow across a corresponding length of the inlet channel 223 of the skimmer device 220. In particular, the discussed increase in width compensates for the decrease in velocity of the airflow as it moves from the first end 302 of the air duct 221 to the intermediate point 308. The change in size of the cutout section 306 and the change in velocity of the airflow through the first section 320 of the air duct 221 will now be discussed with reference to FIG. 4A-4F.

Figure 4A:
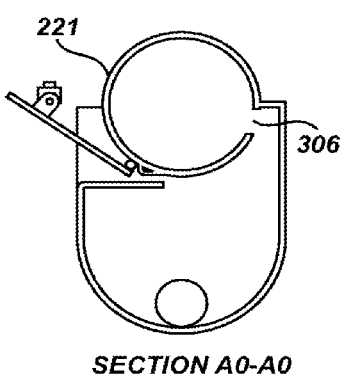
FIG. 4A is a diagram illustrating a section view of the skimmer of FIG. 2, taken along line A0-A0, as indicated in FIG. 3A.
Figure 4B:
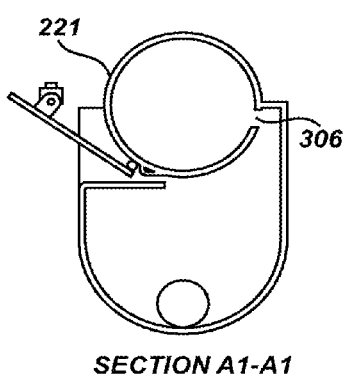
FIG. 4B is a diagram illustrating a section view of the skimmer of FIG. 2, taken along line A1-A1, as indicated in FIG. 3A.
Figure 4C:
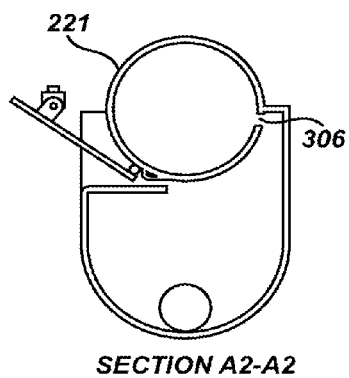
FIG. 4C is a diagram illustrating a section view of the skimmer of FIG. 2, taken along line A2-A2, as indicated in FIG. 3A.
Figure 4D:
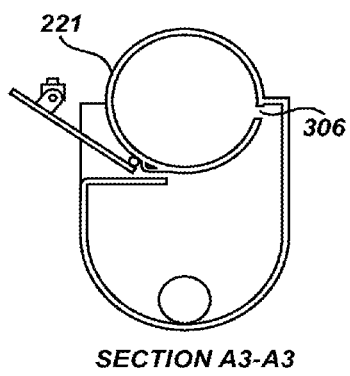
FIG. 4D is a diagram illustrating a section view of the skimmer of FIG. 2, taken along line A3-A3, as indicated in FIG. 3A.
Figure 4E:
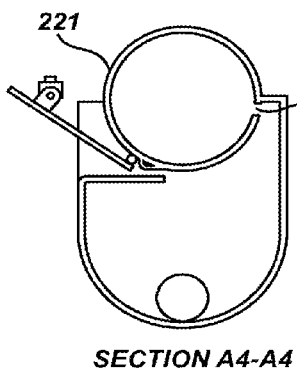
FIG. 4E is a diagram illustrating a section view of the skimmer of FIG. 2, taken along line A4-A4, as indicated in FIG. 3A.
Figure 4F:
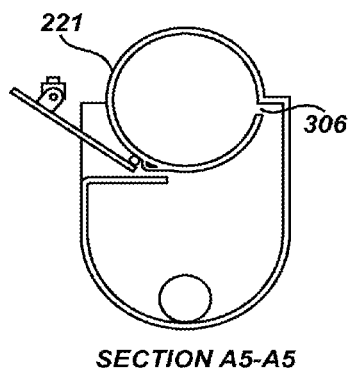
FIG. 4F is a diagram illustrating a section view of the skimmer of FIG. 2, taken along line A5-A5, as indicated in FIG. 3A.

Referring now to FIG. 4A-4F, diagrams are shown illustrating section views of the first section 320 of the skimmer device 220 of FIG. 2, as indicated in FIG. 3A. As shown, when moving from section view A5-A5 (located near the first end 302 of the air duct 221), as shown in FIG. 4F, to section view A0-A0 (located at the intermediate point 308 along the air duct 221) as shown in FIG. 4A, the velocity of the airflow decreases from approximately 4172 feet per minute (FPM) to approximately 1845 FPM. In order to compensate for this decrease in airflow velocity the width of the slot-shaped cutout section 306 increases from approximately 0.8 inches (approximately 2 centimeters) at section A5-A5 of FIG. 4F to approximately 2 inches (approximately 5 centimeters) at section A0-A0. The additional section views A4-A4, A3-A3, A2-A2, and A1-A1, show in FIGS. 4E, 4D, 4C and 4B respectively, serve to illustrate the discussed inverse relationship between airflow velocity and cutout section width.

Referring back to FIG. 3A and FIG. 3B, in the exemplary embodiment the cutout section 306 may be used in combination with another airflow control mechanism to provide the desired uniform negative air pressure along the length of the inlet channel 223 of the skimmer device 220. This additional airflow control mechanism may in one embodiment be a buffer plate 310, which as shown in FIG. 3A is inserted into the second end 304 of the air duct 221. By way of example only, the buffer plate 310 may be substantially elliptical in shape. The buffer plate 310 restricts air from flowing through a section of the air duct 221, labeled as 314 in FIG. 3B. The section of the restricted space 314 increases towards the second end 304 of the air duct 221. The change in size of the cutout section 306 and the change in velocity of the airflow through section 330 of the air duct 221 will now be discussed with reference to FIG. 5A-5E.

Figures 5A, 5B, 5C:
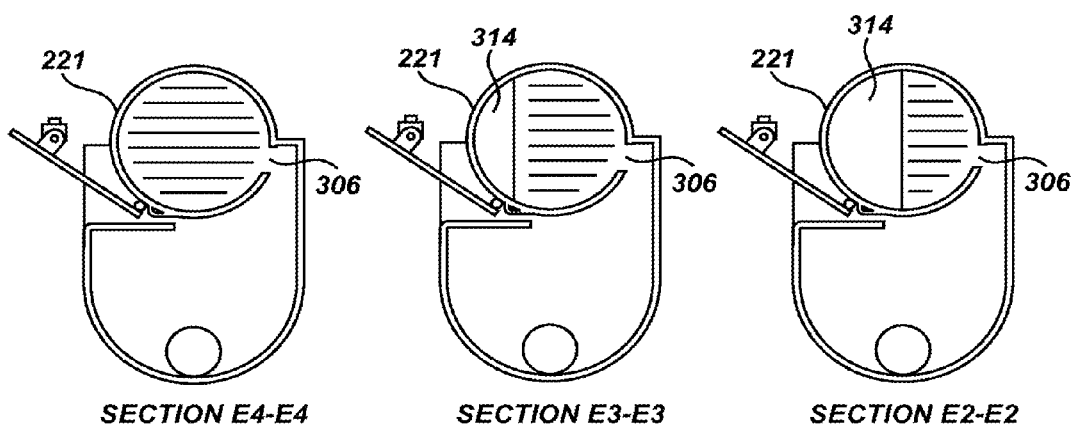
FIG. 5A is a diagram illustrating a section view of the skimmer of FIG. 2, taken along line E4-E4, as indicated in FIG. 3A.
FIG. 5B is a diagram illustrating a section view of the skimmer of FIG. 2, taken along line E3-E3, as indicated in FIG. 3A.
FIG. 5C is a diagram illustrating a section view of the skimmer of FIG. 2, taken along line E2-E2, as indicated in FIG. 3A.
Figures 5D, 5E:
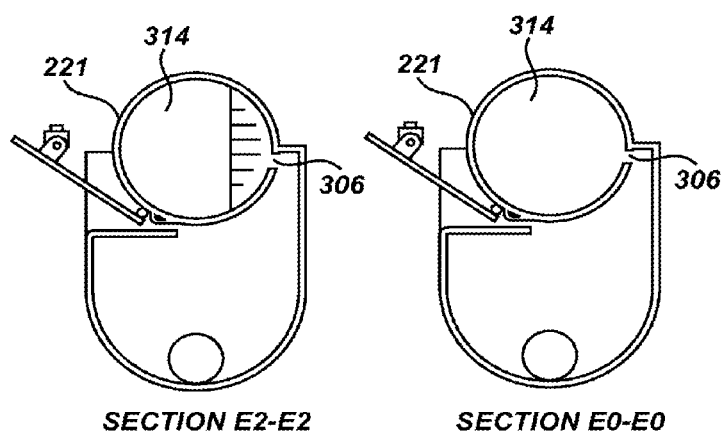
FIG. 5D is a diagram illustrating a section view of the skimmer of FIG. 2, taken along line E1-E1, as indicated in FIG. 3A.
FIG. 5E is a diagram illustrating a section view of the skimmer of FIG. 2, taken along line E0-E0, as indicated in FIG. 3A.

Referring now to FIG. 5A-5E, diagrams are shown illustrating section views of section 330 of the skimmer device 220 of FIG. 2, as indicated in FIG. 3A. As discussed, the velocity of air through the air duct 221 decreases when moving from the first end 302 to the second end 304 of the air duct. The previously discussed slot-shaped cutout section 306 increases in width through the first section 320 of the air duct 221 to compensate for the reduction in velocity. However, insertion of the buffer plate 310 increases airflow velocity as it moves from the intermediate point 308 to the second end 304 of the air duct 221. Accordingly, the cutout section 306 does not need to increase in width through section 330 of the exemplary air duct 221. When moving from section view E4-E4 (located at intermediate point 308 of the air duct 221), as shown in FIG. 5A, to section view E1-E1 (located at second end 304 of the air duct 221) as shown in FIG. 5D, the velocity of the airflow increases from approximately 1018 feet per minute (FPM) to approximately 1292 FPM. The buffer plate 310 is able to achieve this increase in airflow velocity due to the increase in cross-sectional area of the restricted space 314 towards the second end 304 of the air duct 221. The width of the slot accordingly decreases from approximately 2 inches (approximately 5 centimeters) at section E4-E4, as shown in FIG. 5A to approximately 0.94 inches (approximately 2.4 centimeters) at section E0-E0 of FIG. 5E. The additional section views E3-E3, E2-E2, and E1-E1, shown in FIGS. 5B, 5C and 5D respectively, serve to illustrate the discussed relationship between airflow velocity, the cross-sectional area of the restricted space 314 and the width of the cutout section 306. For any particular skimmer device, the width of the slot-shaped-cutout section 306 has a maximum size restriction related to the diameter of the air duct 221. For longer skimmer devices, the slot width may not be able to be increased to a size to effectively control airflow velocity along the entire length of the air duct 221. It is noted that other methods for compensating for the velocity reduction in the airflow through the duct may also be employed. Such methods may include modifying the shape of the air duct to, be conical or adding one or more additional air blowers to the opposite end of the air duct 221. These methods may be used alone or in combination with the previously described cutout section 306 or buffer plate 310.

Figure 6:
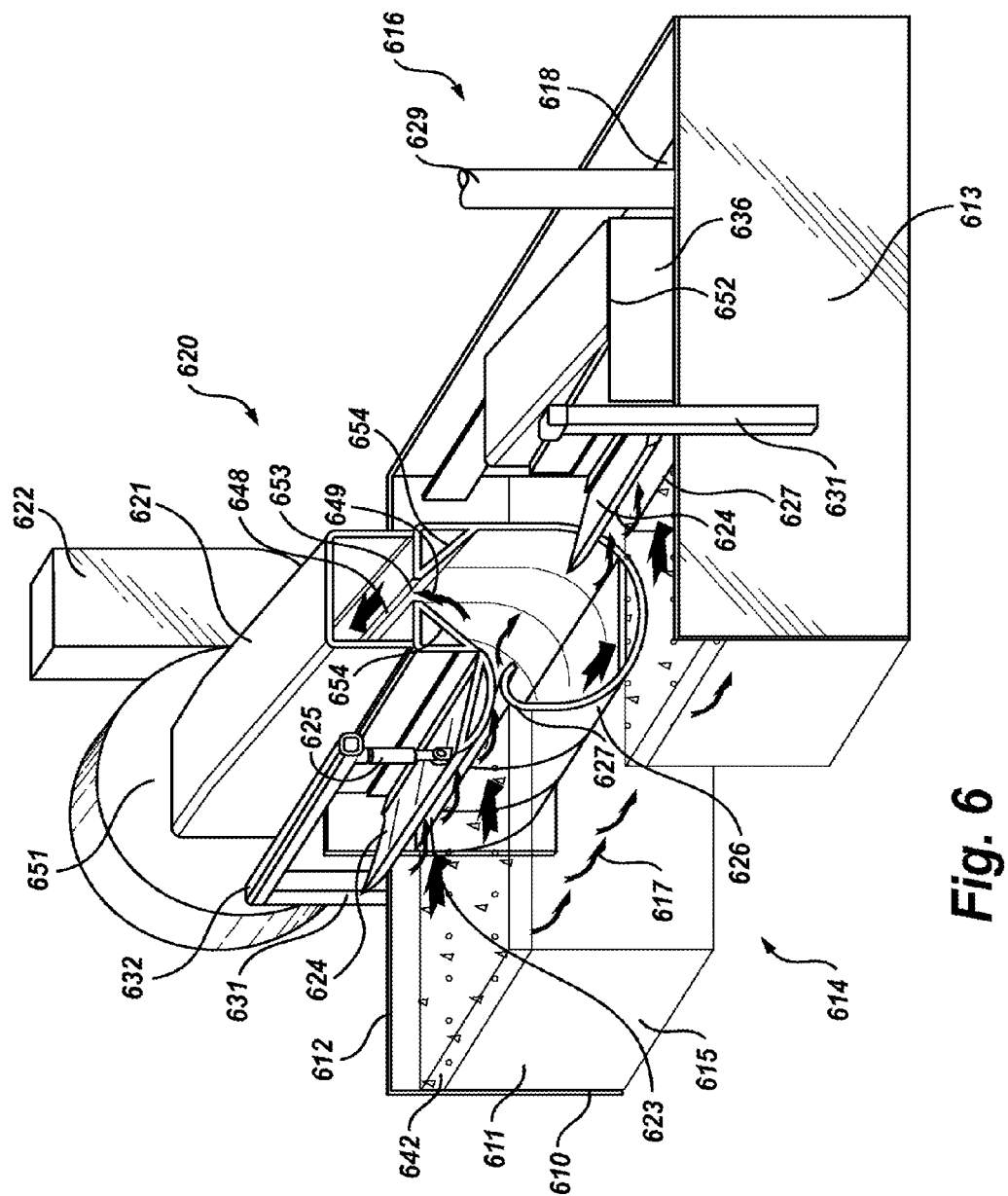
FIG. 6 is a diagram illustrating a perspective view of a DAF tank housing a sludge skimmer in accordance with another exemplary embodiment of the invention.

Referring now to FIG. 6, a diagram is shown illustrating a perspective view of a DAF tank 610 and skimmer device 620 in accordance with another exemplary embodiment of the invention. As shown, the exemplary DAF tank 610 comprises a DAF tank housing 611 adapted to hold a fluid body 615 containing suspended matter that is desired to be removed from the fluid body 615. The fluid body 615 may be waste water contaminated by suspended matter such as biological sludge, algae, fibers or other particulate contaminants introduced during various processes such those carried out at paper mills. One or more inlet pipes (not shown), are disposed at a proximal end 614 of the DAF tank 610. The inlet pipes are responsible for releasing waste water and microscopic air bubbles into the fluid body 615 contained in the DAF tank 610. These bubbles adhere to the suspended matter and carry the suspended matter to the surface of the fluid body 615 thereby forming a sludge layer 642 near the surface of the fluid body 615. The skimmer device 620 is housed toward a distal end 616 of the DAF tank 610 and is responsible for removing the sludge layer 642 from the surface of the underlying fluid body 615. The skimmer device 620 comprises an air duct 621 adapted to uniformly distribute airflow longitudinally along an inlet channel 623. The air duct 621 is connected to an air blower 622 at a first outlet end 651 which generates negative pressure to draw airflow through the air duct 621. The air duct 621 decreases in cross-sectional size from the first end 651 to a second end 652 to provide substantially uniform airflow velocity along the length of the air duct. Providing substantially uniform air flow velocity along the length of the air duct 621 in turn provides the uniform distribution of airflow along the inlet channel 623 as previously discussed. As shown, and by way of example only, the air duct 621 may be an elongated conduit having vertical cross-sections that are substantially rectangular in shape. At the first end 651, the air duct 621 has a square open base that connects to the air blower 622. The air duct 621 also includes a bottom section that extends from the first end 651 to the second end 652. The bottom section of the air duct 621 is adapted to mate with a top surface of a separation chamber 626. The air duct 621 also includes a top section that slopes downward from the first end 651 to the second end 652. The air duct 621 further comprises parallel side sections substantially triangular in shape that connect the top and bottom sections of the air duct. The air duct 621 decreases in cross-sectional size from the first end 651 of the air duct 621 to the second end 652 where edges of the top and bottom sections meet.

The cross-sectional area of the air duct 621, may be calculated at a given point by the following Equation (4):

$$Ax = (D2/L)X \quad (4)$$

In the preceding Equation (4), Ax represents the cross sectional area of the duct at length X in units of Square Feet (FΛ2). The length X is measured from the second end of the air duct 621 in units of Feet. D represents the width of the duct 621 and the height of the duct at the first end of the air duct in units of Feet. L represents the total length of the duct also in units of Feet.

As shown, the air duct 621 also includes a cutout section 648 disposed along the bottom section of the air duct. The cutout section 648 allows air to be drawn into the air duct 621 from the separation chamber 626, as indicated by arrows labeled generally as 649, and ultimately from the inlet channel 623 of the skimmer device 620. The cutout section 648 may be shaped as a slot that is cut longitudinally along the length of the air duct 621 and has a substantially uniform width.

The width of the slot-shaped cutout section 648 of the air duct 621, may be calculated by the following Equation (5):

$$W = f(D2/L) \quad (5)$$

In the preceding Equation (5), W represents the width of the cutout section 648 of the duct 621 measured in units of feet; f is a parameter of pressure loss at the cutout section 648. The parameter of pressure loss has been determined by testing to be approximately 0.7. It is however noted that the parameter of pressure loss may range from approximately 0.5-0.9. D represents the width of the air duct 621 and the height of the air duct at the first end of the air duct in units of feet. L represents the total length of the air duct 621 measured in units of feet.

It is noted that vertical cross-sections of the air duct 621 may alternately take a variety of shapes (e.g. elliptical, semi-elliptical or polygonal) that decrease in size from the first outlet end 651 of the air duct 621 to the second end 652, each variation having an associated cutout section 648 shaped to provide substantially uniform airflow along the length of the inlet channel 623 of skimmer device 620.

The skimmer device 620 further comprises the separation chamber 626 for collecting sludge. The separation chamber 626 is connected at one end to a pump (not shown). The pump is also connected to an outlet pipe 629 through which the pump discharges the sludge to an external sludge tank (not shown). The separation chamber 626 also includes a top surface having a slot-shaped cutout 653 disposed thereon, the slot-shaped cutout 653 shaped to mate with the slot-shaped cutout section 648 of the air duct 621. The top section of the separation chamber 626 also includes two elongated support members 654 each having a first edge positioned proximate to an edge of the slot-shaped cutout 653 and a second edge located proximate an internal wall of the separation chamber 626. The elongated support members 654 provide structural support sufficient for allowing the top section of the separation chamber 626 to support the load of the air duct 621. By way of example, the air duct 621 may be attached to the top section of the separation chamber 626 by way of bolts or similar attachment means. The separation chamber 626 is also longitudinally connected to a lower inlet plate 627. When the skimmer device 620 is mounted within the DAF tank 610, the top surface of the lower inlet plate 627 may be oriented substantially parallel to the surface of the fluid body 615. As shown, lower inlet plate 627 may alternately have a curvature suitable for reducing resistance and facilitating drawing in of sludge from the surface of the fluid body 615. The shape of the curvature may be concave down relative to a horizontal plane. The top surface of the lower inlet plate 627 is also configured to be positioned a sufficient distance above the surface of the fluid body 615 to prevent gravity from alone causing the fluid to flow over the lower inlet plate 627. A distal portion of the lower inlet plate 627 is positioned below the air duct 621, forming the inlet channel 623 through which sludge is lifted and blown from the surface of the fluid body 615 in to the skimmer device 620. The lower inlet plate 627 and separation chamber 626 may be formed as a single structure or as multiple components in a similar manner to that discussed with regard to the embodiment of FIG. 1A.

The skimmer device 620 may also comprise one or more upper inlet plates, labeled generally as 624, configured with the skimmer device 620 to extend the inlet channel 623. By way of example only, the upper inlet plates 624 may be pivotally attached to the separation chamber 626 by way of hinges or similar attachment mechanisms. The upper inlet plates 624 may also comprise a substantially flat upper section and a convex curved lower section. Such a configuration provides several benefits including increased rigidity. The curved lower section also provides reduced resistance and facilities drawing in of sludge from the surface of the fluid body 615.

By way of example only, the separation chamber 626 and lower inlet plate 627 are formed from bent sheet metal, having a thickness of 0.0625 inches (approximately 0.16 centimeters) and may be capped at each end by sidewalls labeled generally as 636. By way of example only, each sidewall 636 may be a steel plate having a thickness of 0.25 inches (approximately 0.64 centimeters). The sidewalls 636 may be welded to the ends of the bent sheet metal used to form the separation chamber 626 and lower inlet plate 627. The separation chamber 626 and the lower inlet plate 627 may alternately be formed as separate components that are fixedly attached for example by welding the components together. The air duct 621 may also be formed from bent sheet metal having, for example, a thickness of 0.0625 inches (approximately 0.16 centimeters). The air duct 621 may be removably attached to the separation chamber 626 by way of one or more bolts (not shown). Rubber seals (not shown) may be used to prevent air leakage from the air duct 621 when attached to the separation chamber 626.

The skimmer device 620 may have two or more modes of operation. The maximum airflow velocity through each section of the inlet channel 623 may be determined by the minimum distance that exists between the lower inlet plate 627 and the lower section of the upper inlet plates 624 when they are rotated toward the lower inlet plate 627. In each mode of operation the one or more upper inlet plates 624 may each have a specific orientation relative to the skimmer device 620. By way of example only, the desired modes of operation may include a skimming mode and an idling mode. When the skimmer device 620 is operated in the skimming mode each of the upper inlet plates 624 is rotated toward the surface of the fluid body 615, thereby narrowing the extended section of the inlet channel 623. When operated in the skimming mode, the proximal end of each of the upper inlet plates 624 will protrude past the proximal end of the lower inlet plate 627, thus being positioned directly over the surface of the fluid body 615. In this manner the airflow velocity is increased in the extended section of the inlet channel 623 (including the area below the proximal end of each of the upper inlet plates 624). The increase in airflow velocity generates negative pressure in the extended section of the inlet channel 623. The negative pressure lifts the sludge that has built up near the proximal end of the lower inlet plate 627 and blows the lifted sludge in to the separation chamber 626. When the skimmer device 620 is operated in the idling mode the upper inlet plates 624 are rotated away from the surface of the fluid body 615, thereby opening the extended section of the inlet channel 623 and decreasing airflow velocity at the proximal end of the extended section of the inlet channel 623. While two upper inlet plates 624 are shown in FIG. 6, it is to be understood that any number of upper inlet plates 624 may be employed depending on application specific factors such as the length of the skimmer device 620 and desired flexibility of operation. The pivoting motion of the upper inlet plates 624 thus allows the extended portion of the inlet channel 623 to be opened or narrowed periodically, thereby allowing the airflow velocity and its negative pressure through the extended portion of inlet channel 623 to be controlled. The exemplary skimmer device 620 further comprises one or more actuators, labeled generally as 625. By way of example only, each actuator 625 may be a linear actuator such as a pneumatic or hydraulic cylinder attached to an upper surface of one of the upper inlet plates 624. While one actuator 625 is shown in the exemplary embodiment, it is to be understood that any number of actuators 625 may be employed depending in part on the number of upper inlet plates 624 used. Each actuator 625 may also be attached to a support structure which as shown in FIG. 6 may include a horizontal support member 632 and two vertical support members labeled generally as 631. The vertical support members 631 may be externally mounted to the side walls 612 and 613 of the DAF tank housing 611 respectively. The actuators 625 may be automatically controlled by an external control system (not shown). It is to be understood that any type of extension mechanism that allows the inlet channel 623 to be opened and narrowed may be contemplated without departing from the spirit and scope of the invention. As indicated by the arrows labeled generally as 617, the fluid body 615 moves from the proximal end 614 of the of the DAF tank housing 611 to a distal end 616 of the DAF tank housing 611. The movement of the fluid body 615 in this manner thus causes the sludge layer 642 to build up at the proximal edge of the lower inlet plate 627. The actuators 625 are responsible for controlling the pivoting motion of the upper inlet plates 624. The actuators 625 may be configured to operate in a periodic fashion based on the flow rate of the fluid body 615 or the duration of time required for sufficient sludge to build up at the lower inlet plate 627 of the skimmer device 620. The actuators 625 may alternately operate in combination with timers and sensors, such as photo sensors, adapted to sense the amount of sludge that has built up in front of the lower inlet plate 627. In this manner the sensors may provide information to an external control system (not shown) capable of automatically determining when to lower (skimming) or raise (idling) each of the upper inlet plates 624. The DAF tank 610 also includes a water weir 618 located at the distal end 616 of the DAF tank 610. The water weir 618 extends from the first sidewall 612 to the second sidewall 613 of the DAF tank housing 611 and is adapted to collect clean water that flows beyond the skimmer device 620.

Figure 7:
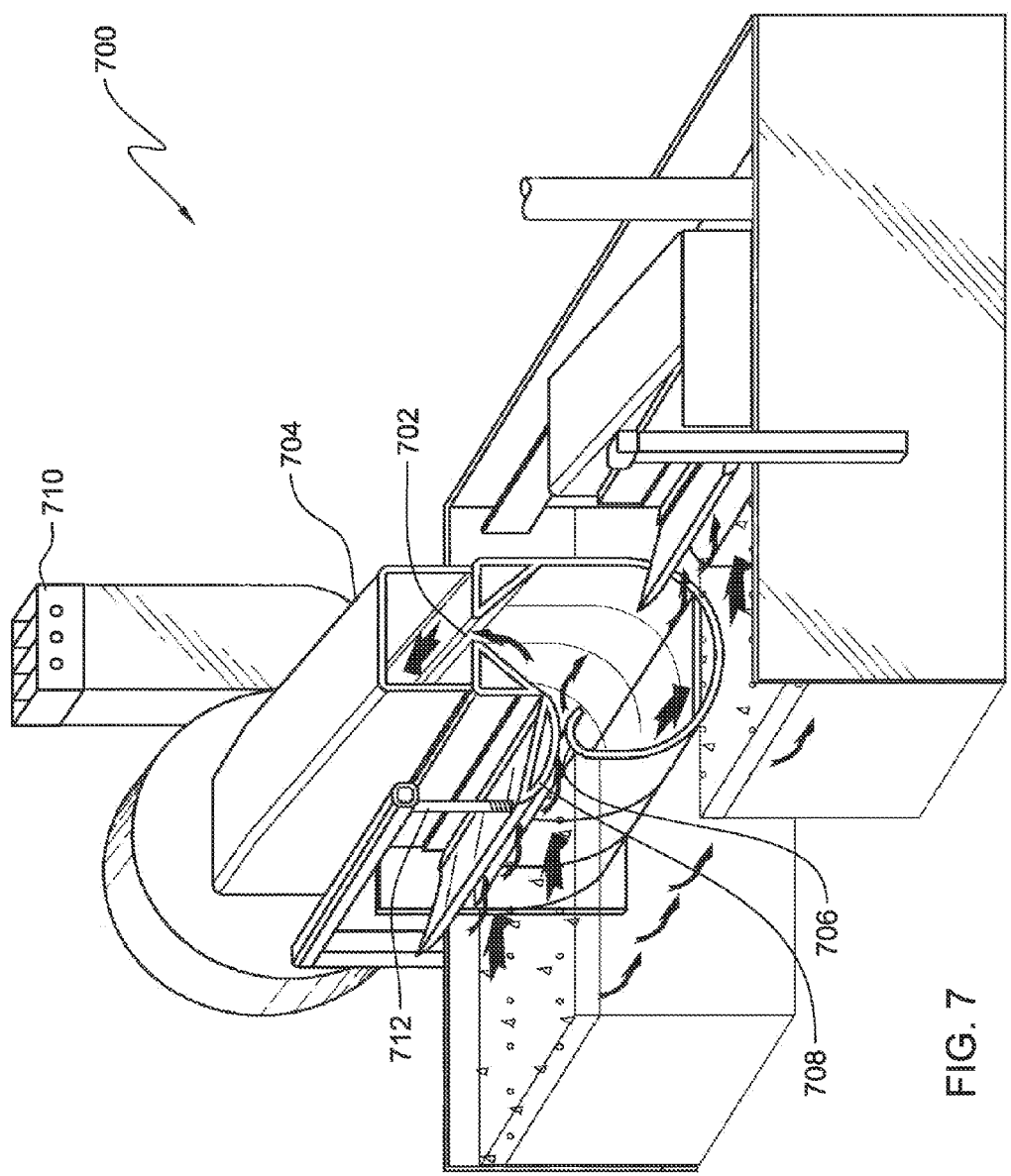
FIG. 7 is a diagram illustrating a perspective view of a Dissolved Air Flotation (DAF) tank housing a skimming device in accordance with a further exemplary embodiment of the invention.

Referring to FIG. 7, a diagram is shown illustrating a perspective view of a dissolved air flotation (DAF) tank and a skimmer device 700 in accordance with an exemplary embodiment of the invention. The skimmer device 700 may have a straight line cutout 702 on the air duct. The air duct 704 may be a square conical air duct. The skimmer device 700 of FIG. 7 is similar to the various embodiments of the skimmer device disclosed in FIGS. 1 to 6 and in particular to the skimmer device 620 of FIG. 6. The skimmer device 700 may have a curved lower inlet plate 706 and a curved upper inlet plate 708 similar to skimmer device 620. The skimmer device 700 of FIG. 7 may also include an airflow damper 710 for controlling air flow velocity through the skimmer device 700. When the airflow damper 710 is open, the skimmer device 700 is in the skimming mode and when the airflow damper 710 is closed, the skimmer device 700 is in the idling mode. A threaded rod 712 may also be included for calibrating the position of the upper inlet plate 708, the position of which may be fixed during operation of the device. In one exemplary embodiment, the threaded rod 712 may be fixed so as to maintain the upper inlet plate 708 at the skimming position. Air flow through the skimmer device 700 would then be controlled only by the airflow damper 710.

Figure 8B:
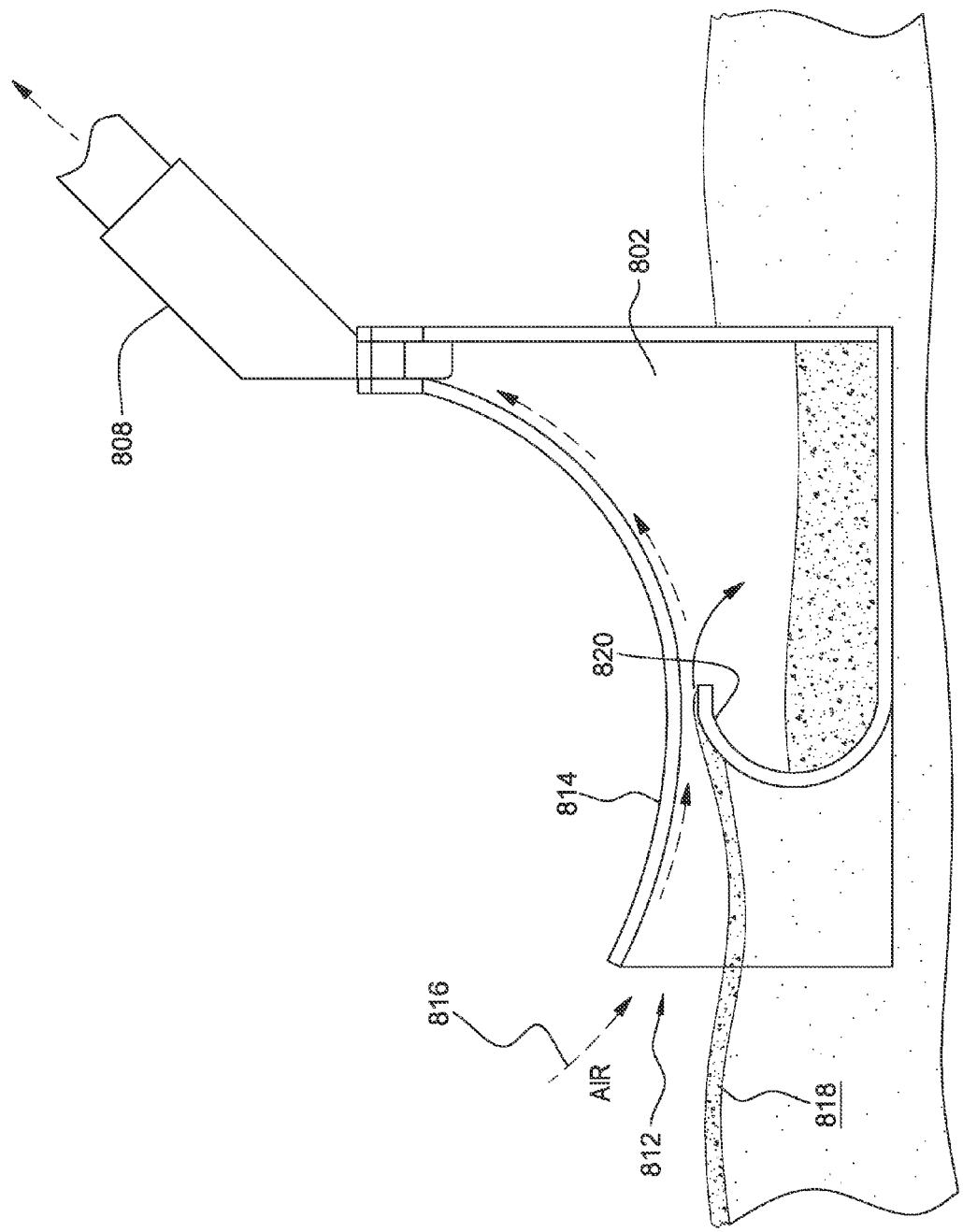
FIG. 8B is a diagram illustrating a section view of the portable skimming device of FIG. 8A.
Figure 8C:
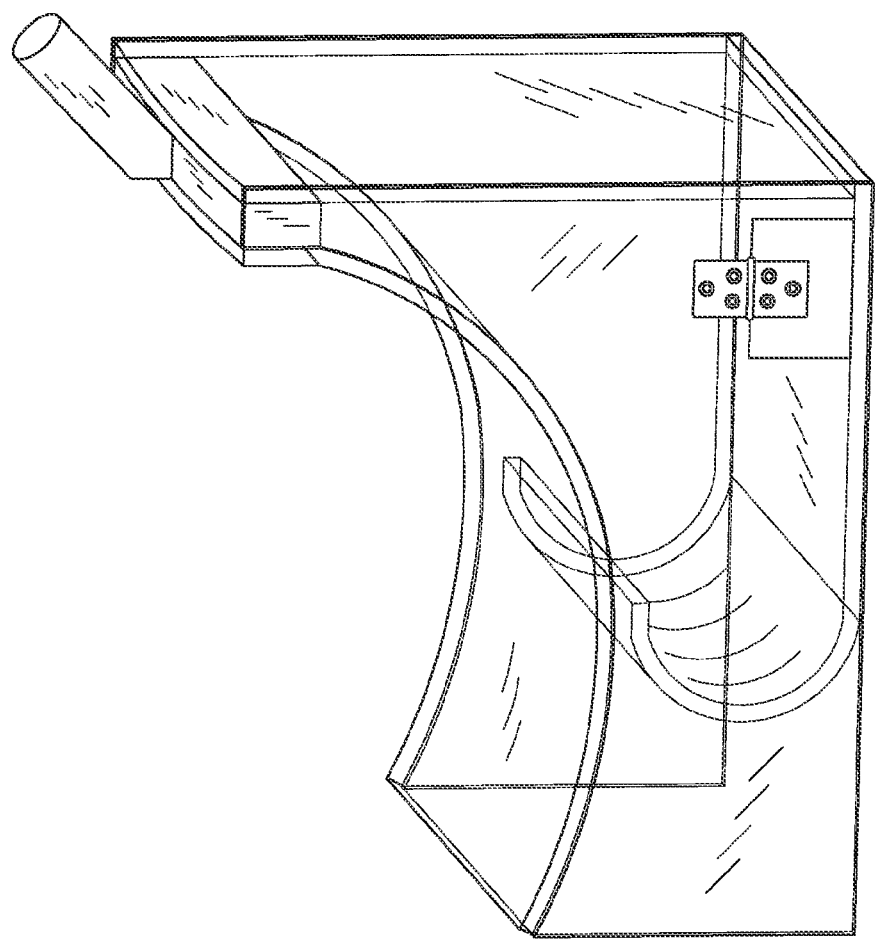
FIG. 8C is a diagram illustrating another perspective view of the portable skimming device of FIG. 8A.
Figure 8D:
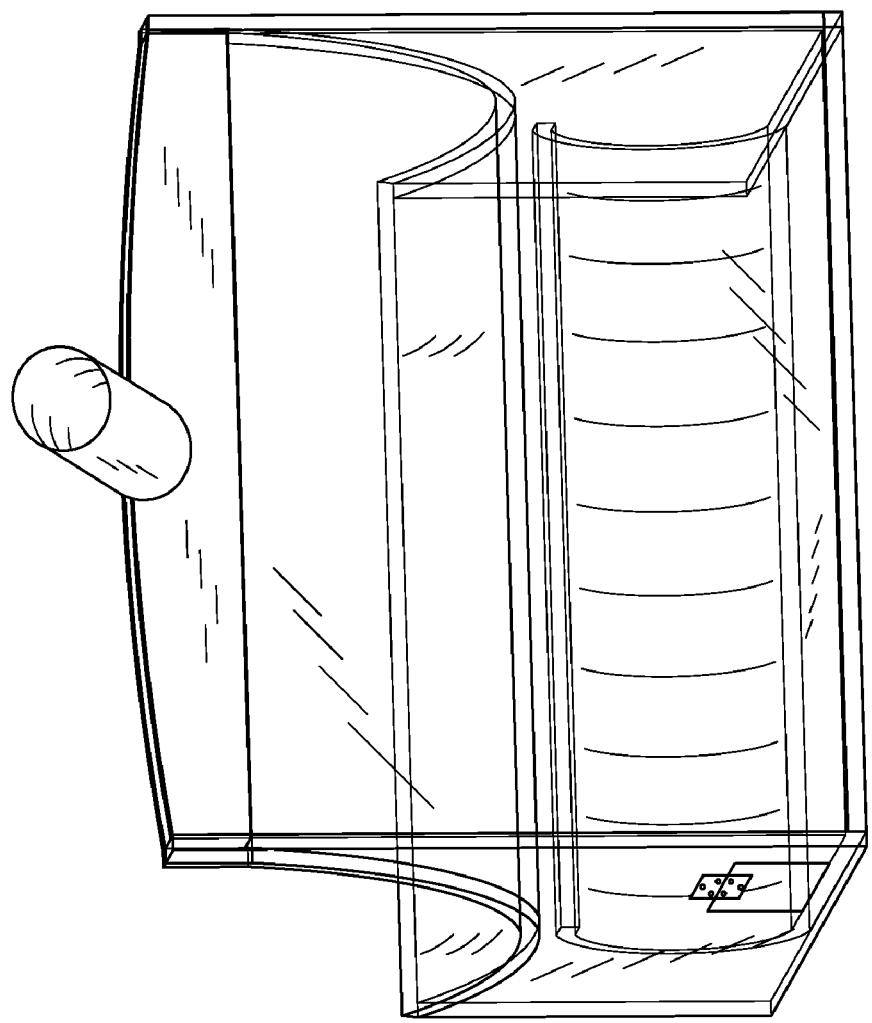
FIG. 8D is a diagram illustrating another perspective view of the portable skimming device of FIG. 8A.

Referring now to FIGS. 8A and 8B, diagrams are shown illustrating a perspective view and section view respectively of a skimmer device in accordance with another exemplary embodiment of the invention. FIG. 8C and FIG. 8D show additional perspective views of the skimmer device of FIG. 8A. As shown, the skimmer device 800 may be a portable skimmer device suitable for use by a single operator. The separation chamber 802 may have an outlet door 804 for allowing oil or sludge to be quickly released from the chamber by an operator into an external container (not shown). Airflow may be provided by a vacuum source, such as wet-dry vac 806. The vacuum source may be connected to the skimmer device body 810 by an attachment 808. Oil or sludge may be pulled into the skimmer device 800 through inlet channel 812. As best seen in FIG. 8B, under the upper plate 814 of the inlet channel 812, the speed of airflow 816 is rising up. The velocity of the airflow 816 generates negative pressure which lifts up the oil or sludge 818 over the lower plate 820 of the inlet channel 812. The airflow 816 blows the lifted oil or sludge 818 into the separating chamber 802. The skimmer device 800 may be comprised of a transparent material such as acrylic or Plexiglas, for allowing the operator to easily view the contents of the separation chamber 802 and the positioning of the skiller device 800 relative to the fluid body.

Figure 9A:
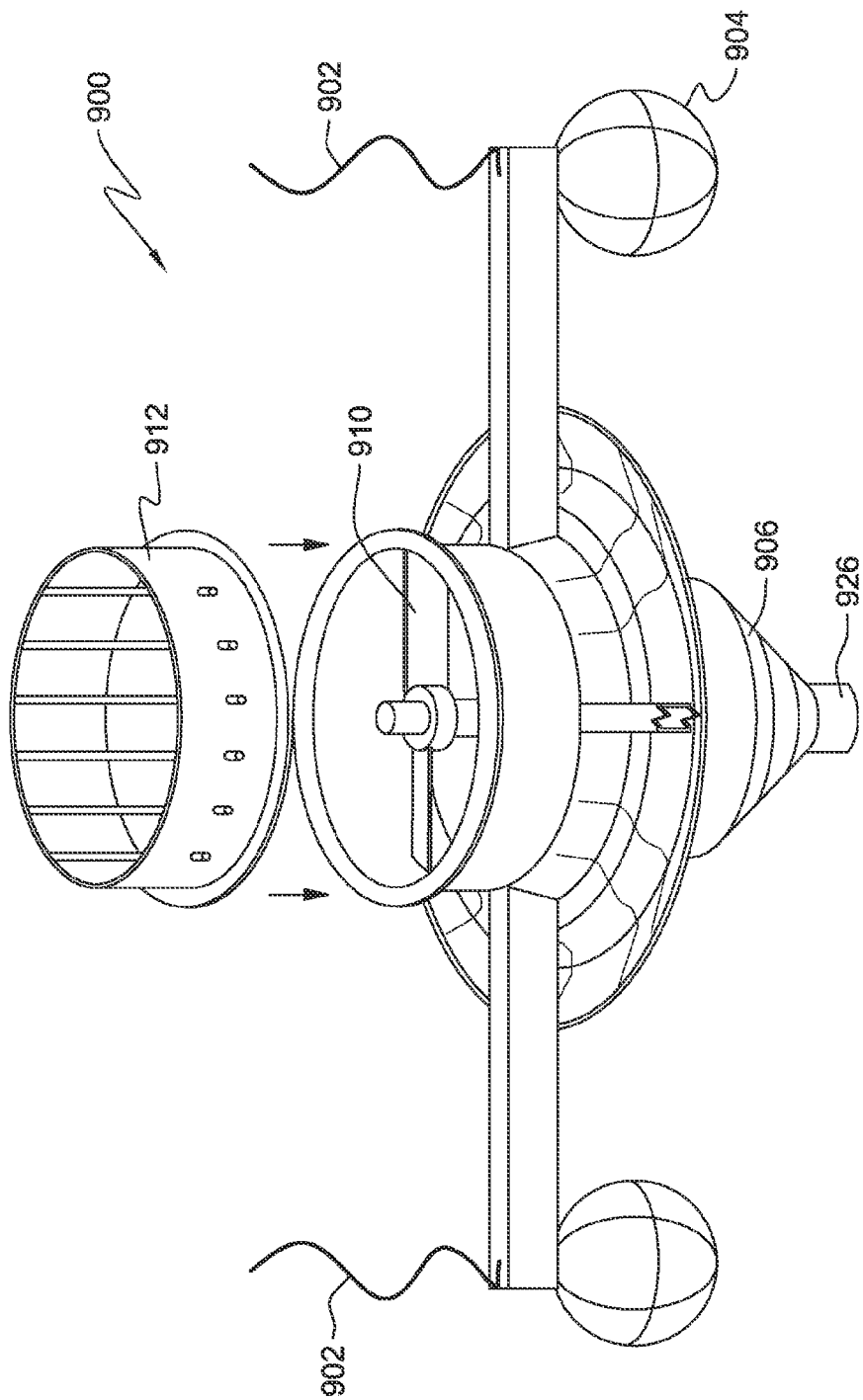
FIG. 9A is a diagram illustrating a perspective view of a floatable skimming device in accordance with another exemplary embodiment of the invention.
Figure 9B:
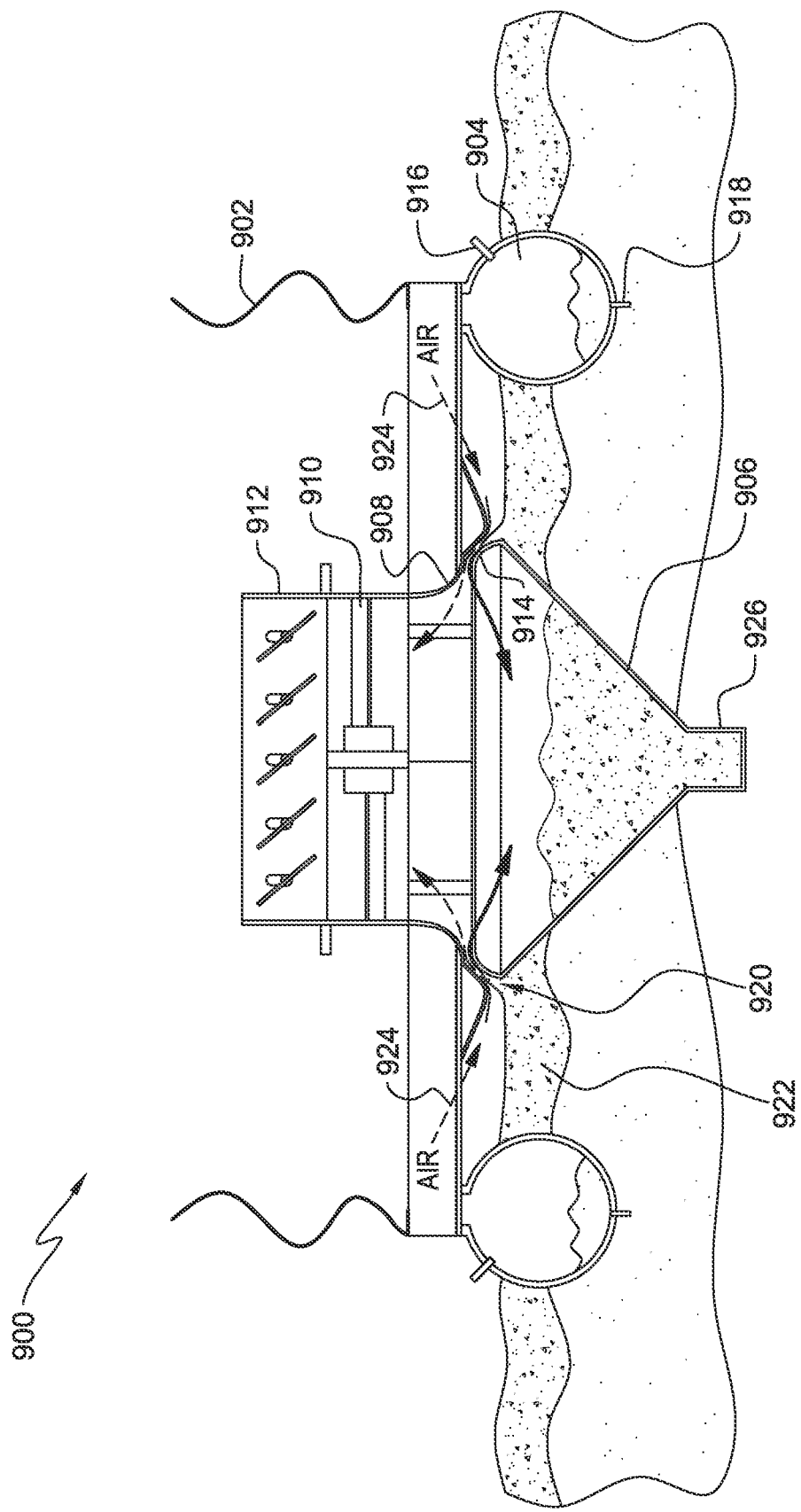
FIG. 9B is a diagram illustrating a section view of the floatable skimming device of FIG. 9A.

Referring now to FIGS. 9A and 9B, diagrams are shown illustrating a perspective view and section view respectively of a skimmer device 900 in accordance with another exemplary embodiment of the invention. As shown, the skimmer device 900 may be a skimmer device suitable for being attached to an external vessel (e.g. a ship) by safety cables 902, for example. There may be at least 3 floating balls 904 to keep the skimming device 900 afloat. At the bottom of the skimmer device 900 will be a separating chamber 906 with an opening 926 to an oil container for removing the oil or sludge from the skimmer device 900. There is an upper inlet plate 908 in the shape of a circle to uniformly distribute airflow which may be provided by a fan 910. The airflow may be controlled by damper 912. Referring specifically to FIG. 9B, the skimmer device 900 may have a circular upper plate 908 and circular lower inlet plate 914 and may include a plurality of flotation elements (floatation balls 904) for stabilizing and controlling the height of the device relative to a body of fluid. The floatation balls 904 may have an air inlet nozzle 916 and a water inlet/outlet nozzle 918. Adjusting the water inside the floatation balls 904 will control the elevation of the floatation balls 904 to make the inlet channel 920 near the surface of the oil or sludge 922. The device may have a separation chamber 906 which at a lower end includes an opening 926 that allows collected oil or sludge to be sent to an oil container (e.g. via a flexible tube). The device may also include a damper 912 for controlling air flow velocity through the skimmer device 900. Under the upper plate 908 of the inlet channel 920, the speed of airflow 924 caused by the fan 910, as adjusted by the damper 912, is rising up. The velocity of airflow 924 generate negative pressure which lifts up the oil or sludge 922 over the lower inlet plate 914 of the inlet channel 920. The airflow 924 blows the lifted oil into the separating chamber 906. Safety cables 902 may also be included for attaching the skimmer device 900 to the vessel.

Referring now to FIG. 10, a diagram is shown illustrating a side section view of a skimmer vessel 1000 in accordance with another exemplary embodiment of the invention. As shown, the skimmer vessel 1000 may include at least one integrated skimming device 1002 suitable for skimming oil or fluid from a fluid body located externally from the vessel. The skimming device 1002 may be configured in a similar manner to any of skimming devices previously discussed. In one exemplary embodiment, the skimming device 1002 may include a hinged upper inlet plate 1004 which may be adjustable by air cylinder 1006. The air cylinder may lift the hinged upper inlet plate 1004 to reduce the airflow velocity 1010 through the inlet channel 1008 or lower it to skim the oil or sludge layer into a first separation chamber 1012. Airflow may be provided by one or more blowers 1016. The skimmer vessel 1000 may also include one or more additional skimmer devices positioned within separation chamber 1012 or a second separation chamber 1014 located within the vessel. The use of multiple skimming devices may allow for further separation of oil or sludge from the underlying fluid (e.g. sea water). The separated oil or sludge may be pumped to an oil tanker while the underlying fluid may be pumped back to the external fluid source (e.g. an ocean, lake or other body of water) The separation chamber may further employ DAF techniques for providing faster separation.

An apparatus and method for removing floated matter such as sludge or oil located near the surface of a fluid body are thus contemplated. The contemplated devices comprise: a connection to an airflow power source (e.g. a blower or a vacuum or a fan) for generating negative pressure; an inlet channel with an upper plate positioned over an oil or floats surface and a lower plate that acts as a weir to prevent water or liquid falling into a separating chamber by gravity alone; a uniform airflow distribution (or collection) mechanism for providing uniform airflow along an inlet channel; and a separating chamber configured to cause air to travel up by the air power source and to cause oil (or floats) to fall down by gravity. In operation, sludge or oil may be removed by the contemplated devices through the following process: The air power source may be configured to cause the speed of the air under the upper plate of the inlet channel to increase. The velocity of the airflow generates negative pressure over the oil (or floats) surface. The negative pressure is increased until it is sufficiently strong to lift up the oil (or floats) over the lower plate of the inlet channel. The airflow then blows the lifted oil (or floats) into the separating chamber. After entering the separating chamber the air travels up to the air power source while the oil or floats with water or liquid falls down by gravity.

The contemplated device requires few moving parts, requires less maintenance and can be manufactured at a lower cost relative to prior art sludge and oil removal devices. The contemplated sludge or oil removal devices employ pneumatic force for drawing sludge into an inlet channel. The devices are configured to provide uniform airflow across the inlet channel. The inlet channel may also include an adjustable section or a fixed section in combination with a damper which can be controlled to allow the pneumatic force to lift sludge from the surface of the underlying fluid body in a periodic fashion. The uniform airflow and periodic operation of the device allows sludge or oil of a high concentration (i.e. little fluid body dilution) to be collected.

Operation of the Skimmer Device

The skimmer device 120 of the exemplary embodiment may be operated in the following exemplary manner. The skimmer device 120 may be first mounted within a DAF tank such as DAF tank 110 of FIG. 1A. The skimmer device 120 is oriented in the DAF tank 110 such that the top surface of the lower inlet plate 127 is located at approximately the same level as the surface of the fluid body 115. It is noted that the surface of the fluid body 115 and the surface of the sludge layer are approximately Coplanar since the sludge is typically substantially submerged below the surface of the fluid body 115. The top surface of the lower inlet plate 127 is positioned at a sufficient level to prevent both water and sludge from being drawn into the separation chamber 126 of the skimmer device 120 by gravity alone. At a next step, the actuator 125 raises the upper inlet plate 124 to the idling position such that when the air blower 122 is turned on, the airflow velocity at the edge of the lower inlet plate 127 is sufficiently small to prevent sludge from being lifted from the surface of the fluid body 115. At a next step the air blower 122 is turned on causing air to be drawn in from the atmosphere through the inlet channel 123. The actuator 125 subsequently lowers the upper inlet plate 124 to the skimming position. Two timers may alternately be started at this point, the first being set to a skimming time corresponding to the duration of time with which the skimmer device 120 is typically able to remove sludge that has built up in front of the lower inlet plate 127. With the upper inlet plate 124 in the skimming position, the airflow velocity below the proximal end of the extended portion of the inlet channel 123 increases to a level sufficient to lift the sludge over the lower inlet plate 127 and blow the sludge through the inlet channel 123 and into the separation chamber 126. As the sludge moves into the separation chamber 126, the velocity of airflow decreases enough to allow gravity to pull the sludge to the bottom of the separation chamber while the air continues to flow up through the cutout section 148, into the air duct 121 and then back to the atmosphere through the air blower 122. When the skimming timer expires, the actuator 125 is triggered to return the upper inlet plate 124 to the idling position. At approximately the same time, the idling timer is triggered to start timing. The idling timer is set to a waiting time consistent with the duration of time required for a sufficient amount of sludge to build up in front of the lower inlet plate 127. It is noted that the skimming and idling times may be predetermined or calibrated after the skimmer device 120 has been installed in a DAF tank to suit the operational capabilities of the DAF tank 110 and/or the application for which the device is being utilized. After the idling time has expired, the actuator 125 is triggered to lower the upper inlet plate 124 to the skimming position. At approximately the same time, the skimming timer is triggered to restart. The previous steps of skimming and idling are then repeated until the sludge has been removed from the DAF tank or the process is manually or automatically halted. In an alternate embodiment a sensor may be used to sense the amount of sludge has built up in front of the lower inlet plate 127. The sensor may then provide information to an external control system to determine when to lower or raise the upper inlet plate 124. The sensor may for example be a photo sensor. Throughout operation of the skimmer device 120, the pump 128 will turn on and off as necessary to discharge sludge that has collected in the separation chamber 126. It is noted that the skimmer device 220 of the exemplary embodiment of FIG. 2 may be operated in a similar manner. The additional upper inlet plates 224 and corresponding actuators 225 however provide the operator with greater control of the airflow along the length of the inlet channel 223.

Thus, a method and device for removing floated matter such as sludge located near the surface of a fluid body is contemplated. The contemplated device requires few moving parts, requires less maintenance and can be manufactured at a lower cost relative to prior art sludge removal devices. The contemplated sludge removal device employs pneumatic force for drawing sludge into an inlet channel. The device is configured to provide uniform airflow across the inlet channel. The inlet channel may also include an adjustable section which can be positioned to allow the pneumatic force to lift sludge from the surface of the underlying fluid body in a periodic fashion. The uniform airflow and periodic operation of the device allows sludge of a high concentration (i.e. little fluid body dilution) to be collected.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. A skimmer device comprising:
 a skimmer body, the skimmer body including:
   an outlet opening for attaching the skimmer body to an air blower;
   an elongated inlet channel comprising an upper section and a lower section, wherein the lower section has a curved upper surface, the curved upper surface being concave down relative to a horizontal plane;
   an airflow distribution mechanism, the airflow distribution mechanism adapted to provide substantially uniform airflow along the elongated inlet channel; and
   a chamber for collecting matter drawn in through the elongated inlet channel.

2. The skimmer device of claim 1 wherein said upper section comprises a flat upper surface and a curved lower surface, the curved lower surface being convex in shape.

3. The skimmer device of claim 1, wherein said airflow distribution mechanism comprises an air duct having at least one cutout section, said air duct shaped to provide said substantially uniform airflow along said elongated inlet channel.

4. The skimmer device of claim 3, wherein the outlet is located at a first end of said air duct, and wherein said air duct has a cross-sectional area that decreases in size from the first end of the air duct towards a second end of the air duct.

5. The skimmer device of claim 4, wherein said at least one cutout section is a slot-shaped cutout having a width that is substantially uniform in size along the length of the air duct.

6. The skimmer device of claim 1 wherein the upper section is fixed in position.

7. The skimmer device of claim 1 wherein the airflow distribution mechanism further comprising an airflow damper to control airflow through the skimmer body.

8. The skimmer device of claim 1 further comprising at least one blower attached to the skimmer body, the blower configured to provide sufficient air flow velocity along said elongated inlet channel to draw in matter into said chamber.

9. A device for removing floated sludge from a dissolved air flotation tank comprising:
 a skimmer body, the skimmer body including:
   one or more outlet openings for attaching the skimmer body to an air blower;
   an elongated inlet channel comprising an upper section and a lower section, wherein the lower section has a curved upper surface, the curved upper surface being concave down relative to a horizontal plane;
   an airflow distribution mechanism, the airflow distribution mechanism adapted to provide substantially uniform airflow along the elongated inlet channel; and
   a separation chamber having a first connection to the airflow distribution mechanism and a second connection to the elongated inlet channel, the first and second connections positioned to allow sludge drawn in through said inlet channel to fall to a base of said separation chamber while air drawn in through said elongated inlet channel will be channeled through said separation chamber to the airflow distribution mechanism.

10. The device of claim 9 wherein the airflow distribution mechanism comprises an air duct having at least one cutout section, said air duct shaped to provide said substantially uniform airflow along said elongated inlet channel, and wherein the outlet is located at a first end of said air duct, and wherein said air duct has a cross-sectional area that decreases in size from the first end of the air duct towards a second end of the air duct.

11. The device of claim 10, wherein the at least one cutout section is a slot-shaped cutout having a width that is substantially uniform in size along the length of the air duct.

12. The device of claim 9 wherein the upper inlet plate is fixed in position.

13. The device of claim 9 wherein the airflow distribution mechanism further comprising an airflow damper to control airflow through the skimmer body such that in an open position, the device operates in a skimming mode to draw in sludge into the inlet channel and in a closed position, the device operates in an idle mode in which liquid with less floated sludge is not drawn into the inlet channel.

14. The device of claim 9 further comprising at least one blower attached to the skimmer body, the one or more blowers configured to provide sufficient air flow velocity along said elongated inlet channel to draw in sludge into said chamber.

* * * * *